(12) United States Patent
Imanishi et al.

(10) Patent No.: US 7,727,487 B2
(45) Date of Patent: Jun. 1, 2010

(54) PLASMA REACTION VESSEL, AND METHOD OF PRODUCING THE SAME

(75) Inventors: Yuichiro Imanishi, Nagoya (JP); Shinichi Miwa, Nagoya (JP); Fumio Abe, Nagoya (JP); Yukio Miyairi, Nagoya (JP)

(73) Assignees: NGK Insulators, Ltd., Nagoya (JP); Honda Motor Co., Ltd., Tokyo (JP)

( * ) Notice: Subject to any disclaimer, the term of this patent is extended or adjusted under 35 U.S.C. 154(b) by 1310 days.

(21) Appl. No.: 10/544,527

(22) PCT Filed: Feb. 12, 2004

(86) PCT No.: PCT/JP2004/001452

§ 371 (c)(1), (2), (4) Date: Aug. 4, 2005

(87) PCT Pub. No.: WO2004/072445

PCT Pub. Date: Aug. 26, 2004

(65) Prior Publication Data

US 2006/0133970 A1    Jun. 22, 2006

(30) Foreign Application Priority Data

Feb. 12, 2003    (JP) ............................ 2003-034425

(51) Int. Cl.
   *B01J 19/08*    (2006.01)

(52) U.S. Cl. ...................... 422/186.01; 29/890; 445/33; 445/35; 445/46

(58) Field of Classification Search ............ 422/186.01; 29/890; 445/33, 35, 46
   See application file for complete search history.

(56) References Cited

U.S. PATENT DOCUMENTS 5,407,639 A * 4/1995 Watanabe et al. ...... 422/186.07
6,354,903 B1 * 3/2002 Nelson ......................... 445/58
6,821,493 B2 * 11/2004 Nelson et al. .......... 422/186.04
6,979,892 B2 * 12/2005 Li et al. ....................... 257/682
2001/0040089 A1   11/2001 Hemingway et al.
2003/0011101 A1 * 1/2003 Jansson ................... 264/209.3

FOREIGN PATENT DOCUMENTS

| DE | 100 26 725 A1 | 1/2001 |
|----|---|---|
| EP | 1 158 072 A2 | 11/2001 |
| JP | A 7-047223 | 2/1995 |
| JP | A 2001-009232 | 1/2001 |
| JP | A 2001-164925 | 6/2001 |
| JP | A 2002-097936 | 4/2002 |
| JP | A 2002-126445 | 5/2002 |
| WO | WO 02/074435 A1 | 9/2002 |

* cited by examiner

*Primary Examiner*—Alexa D Neckel
*Assistant Examiner*—Xiuyu Tai
(74) *Attorney, Agent, or Firm*—Oliff & Berridge, PLC

(57) ABSTRACT

In the plasma reaction vessel (1) of the invention, two or more laminate-structures (6) having ceramic formed bodies (3, 4) in which a plasma generating electrode (2) capable of generating plasma is formed in two-tape-form, and an electrically continuous film-like electrically conductive electrode (5) held between the two ceramic formed bodies (3, 4) are formed in such a manner as to form a plasma generating space (7) containing mutual laminate planes therein. Of the electrically conductive electrodes (5), adjacent ones are capable of having electric discharge produced therebetween so as to generate the plasma in the plasma generating space (7) and of generating uniform stabilized plasma at low electric power, it being possible to reduce a passage resistance to a gas passing therein.

11 Claims, 30 Drawing Sheets

PLASMA REACTION VESSEL, AND METHOD OF PRODUCING THE SAME

TECHNICAL FIELD

The present invention relates to a plasma reactor and a method of manufacturing the same. More particularly, the invention relates to a plasma reactor which can generate uniform and stable plasma at low power consumption and can reduce the passage resistance of a gas which passes through the plasma reactor, and a method of manufacturing the same.

BACKGROUND ART

It is known that silent discharge occurs when applying a high-voltage alternating current or a periodic pulse voltage to a dielectric disposed between two electrodes, and active species, radicals, and ions are produced in the resulting plasma field to promote a reaction and decomposition of a gas. This phenomenon may be utilized for removing toxic components contained in engine exhaust gas or various incinerator exhaust gases.

For example, a plasma reactor or the like which processes $NO_x$ carbon particulate, HC, CO, and the like contained in engine exhaust gas or various incinerator exhaust gases in the plasma field by causing the engine exhaust gas or various incinerator exhaust gases to pass through the plasma field has been disclosed (e.g. JP-A-2001-164925).

However, since the distance between the electrodes must be reduced in order to form a structure which uniformly and stably generates plasma at low power consumption and allows a gas such as exhaust gas to efficiently pass through the plasma field, the number of parts is increased and assembly becomes complicated. Moreover, a variation of the dimensions of each part which makes up the electrode used to generate plasma adversely affects the performance of the plasma reactor. Furthermore, engine trouble or an increase in fuel consumption occurs due to an increase in the passage resistance of the gas which passes through the plasma reactor.

DISCLOSURE OF THE INVENTION

The invention has been achieved in view of the above-described problems, and provides a plasma reactor which can generate uniform and stable plasma at low power consumption and can reduce the passage resistance of a gas which passes through the plasma reactor, and a method of manufacturing the same.

Specifically, the invention provides the plasma reactor and a method of manufacturing the same.

[1] A plasma reactor, comprising a plasma generating electrode capable of generating plasma upon application of a voltage, and capable of causing a gas to react by the plasma generated, wherein the plasma generating electrode is configured by layering two or more multilayer structures, each of the multilayer structures including two tape-shaped ceramic formed bodies and an electrically continuous film-shaped conductor electrode disposed between the ceramic formed bodies, so that a plasma generating space including a layer surface between the multilayer structures is formed therein, or winding or folding two or more (even number) of the multilayer structures so that a plasma generating space including a layer surface between the multilayer structures is formed therein; and wherein the plasma can be generated in the plasma generating space by discharging electricity between the conductor electrodes adjacent to each other (hereinafter may be called "first invention").

[2] The plasma reactor as defined in [1], wherein recesses and protrusions are formed at one of two outer surfaces of the two ceramic formed bodies, which make up the multilayer structure, other than surfaces which hold the conductor electrode, and the recess formed in the surface of the ceramic formed body forms the plasma generating space.

[3] The plasma reactor as defined in [1] or [2], wherein the conductor electrode is disposed on the ceramic formed body by printing.

[4] A plasma reactor, comprising a plasma generating electrode capable of generating plasma upon application of a voltage, and capable of causing a gas to react by the plasma generated, wherein the plasma generating electrode is configured by layering two or more multilayer structures, each of the multilayer structures including two tape-shaped ceramic formed bodies, an electrically continuous film-shaped first conductor electrode disposed between the ceramic formed bodies, and an electrically continuous film-shaped or plate-shaped second conductor electrode disposed on one of two outer surfaces of the two ceramic formed bodies other than surfaces which hold the first conductor electrode, so that a plasma generating space including a layer surface between the multilayer structures is formed therein, or winding or folding one or more of the multilayer structure so that a plasma generating space including wound surfaces or folded surfaces of the multilayer structures is formed therein; and wherein the plasma can be generated in the plasma generating space by discharging electricity between the adjacent first and second conductor electrodes (hereinafter may be called "second invention").

[5] The plasma reactor as defined in [4], wherein recesses and protrusions are formed at at least one of two outer surfaces of the two ceramic formed bodies, which make up the multilayer structure, other than surfaces which hold the first conductor electrode, and the recess formed in the surface of the ceramic formed body forms the plasma generating space.

[6] The plasma reactor as defined in [4] or [5], wherein the first conductor electrode is disposed on the ceramic formed body by printing.

[7] The plasma reactor as defined in [6], wherein the second conductor electrode is disposed on the ceramic formed body by printing.

[8] The plasma reactor as defined in any of [1] to [7], wherein the plasma generating electrode is placed in a conductive casing with a buffer material having conductive and elasticity interposed therebetween.

[9] The plasma reactor as defined in any of [1] to [8], wherein the multilayer structure includes at least one material selected from the group consisting of cordierite, mullite, alumina, silicon nitride, SIALON, and zirconia.

[10] The plasma reactor as defined in any of [1] to [9], wherein porosity of the multilayer structure is 0.5 to 35%.

[11] The plasma reactor as defined in any of [2], [3], and [5] to [10], wherein a relationship between a thickness t of a thin section of the plasma generating electrode and a height h of the protrusion formed on the surface of the multilayer structure which makes up the plasma generating electrode satisfies the following equation (1).

$$0.7t < h \tag{1}$$

[12] The plasma reactor as defined in any of [1] to [1] wherein a thickness t of a thin section of the plasma generating electrode is 0.2 to 6 mm.

[13] The plasma reactor as defined in any of [1] to [12], the plasma reactor being installed in an engine combustion gas exhaust system.

[14] A method of manufacturing a plasma reactor which includes a plasma generating electrode capable of generating plasma upon application of a voltage and can cause a gas to react by the plasma generated, the method comprising: forming tape-shaped first and second unfired ceramic formed bodies by tape-forming; printing a conductor electrode on one surface of the resulting first unfired ceramic formed body to form an unfired ceramic formed body having an electrode; layering the resulting unfired ceramic formed body having an electrode and the second unfired ceramic formed body so as to cover the conductor electrode of the unfired ceramic formed body having an electrode to form an unfired multilayer structure; firing the resulting unfired multilayer structure to form a multilayer structure; and layering two or more of the resulting multilayer structures to form the plasma generating electrode (hereinafter may be called "third invention").

[15] A method of manufacturing a plasma reactor which includes a plasma generating electrode capable of generating plasma upon application of a voltage and can cause a gas to react by the plasma generated, the method comprising: forming tape-shaped first and second unfired ceramic formed bodies by tape-forming; printing a conductor electrode on one surface of the resulting first unfired ceramic formed body to form an unfired ceramic formed body having an electrode; layering the resulting unfired ceramic formed body having an electrode and the second unfired ceramic formed body so as to cover the conductor electrode of the unfired ceramic formed body having an electrode to form an unfired multilayer structure; winding or folding two or more (even number) of the resulting unfired multilayer structures to form a wound unfired multilayer structure; and firing the wound unfired multilayer structure to form the plasma generating electrode (hereinafter may be called "fourth invention").

[16] A method of manufacturing a plasma reactor which includes a plasma generating electrode capable of generating plasma upon application of a voltage and can cause a gas to react by the plasma generated, the method comprising: forming tape-shaped first and second unfired ceramic formed bodies by tape-forming; printing a conductor electrode on one surface of the resulting first unfired ceramic formed body and forming recesses and protrusions at the other surface to form an unfired ceramic formed body having an electrode; layering the resulting unfired ceramic formed body having an electrode and the second unfired ceramic formed body so as to cover the conductor electrode of the unfired ceramic formed body having an electrode to form an unfired multilayer structure; firing the resulting unfired multilayer structure to form a multilayer structure; and layering two or more of the resulting multilayer structures to form the plasma generating electrode (hereinafter may be called "fifth invention").

[17] A method of manufacturing a plasma reactor which includes a plasma generating electrode capable of generating plasma upon application of a voltage and can cause a gas to react by the plasma generated, the method comprising: forming tape-shaped first and second unfired ceramic formed bodies by tape-forming; printing a conductor electrode on one surface of the resulting first unfired ceramic formed body and forming recesses and protrusions at the other surface to form an unfired ceramic formed body having an electrode; layering the resulting unfired ceramic formed body having an electrode and the second unfired ceramic formed body so as to cover the conductor electrode of the unfired ceramic formed body having an electrode to form an unfired multilayer structure; winding or folding two or more (even number) of the resulting unfired multilayer structure to form a wound unfired multilayer structure; and firing the wound unfired multilayer structure to form the plasma generating electrode (hereinafter may be called "sixth invention").

[18] A method of manufacturing a plasma reactor which includes a plasma generating electrode capable of generating plasma upon application of a voltage and can cause a gas to react by the plasma generated, the method comprising: forming tape-shaped first and second unfired ceramic formed bodies by tape-forming; printing a conductor electrode on one surface of the resulting first unfired ceramic formed body to form an unfired ceramic formed body having an electrode; layering the resulting unfired ceramic formed body having an electrode and the second unfired ceramic formed body so as to cover the conductor electrode of the unfired ceramic formed body having an electrode to form an unfired multilayer structure; forming recesses and protrusions at one surface of the resulting unfired multilayer structure to form an unfired multilayer structure having recesses and protrusions; firing the resulting unfired multilayer structure having recesses and protrusions to form a multilayer structure; and layering two or more of the resulting multilayer structures to form the plasma generating electrode (hereinafter may be called "seventh invention").

[19] A method of manufacturing a plasma reactor which includes a plasma generating electrode capable of generating plasma upon application of a voltage and can cause a gas to react by the plasma generated, the method comprising: forming tape-shaped first and second unfired ceramic formed bodies by tape-forming; printing a conductor electrode on one surface of the resulting first unfired ceramic formed body to form an unfired ceramic formed body having an electrode; layering the resulting unfired ceramic formed body having an electrode and the second unfired ceramic formed body so as to cover the conductor electrode of the unfired ceramic formed body having an electrode to form an unfired multilayer structure; forming recesses and protrusions at one surface of the resulting unfired multilayer structure to form an unfired multilayer structure having recesses and protrusions; winding or folding two or more (even number) of the resulting unfired multilayer structures having recesses and protrusions to form a wound unfired multilayer structure; and firing the wound unfired multilayer structure to form the plasma generating electrode (hereinafter may be called "eighth invention").

[20] A method of manufacturing a plasma reactor which includes a plasma generating electrode capable of generating plasma upon application of a voltage and can cause a gas to react by the plasma generated, the method comprising: forming tape-shaped first and second unfired ceramic formed bodies by tape-forming; printing a first conductor electrode on one surface of the resulting first unfired ceramic formed body to form an unfired ceramic formed body having an electrode; layering the resulting unfired ceramic formed body having an electrode and the second unfired ceramic formed body so as to cover the conductor electrode of the unfired ceramic formed body having an electrode to form an unfired multilayer structure; forming recesses and protrusions at each surface of the resulting unfired multilayer structure to form an unfired multilayer structure having recesses and protrusions; disposing a plate-shaped second conductor electrode on one surface of the resulting unfired multilayer structure having recesses and protrusions to form an unfired multilayer structure having an electrode; firing the unfired multilayer structure having an electrode to form a multilayer structure having an electrode; and layering two or more of the resulting multilayer structures having an electrode to form the plasma generating electrode (hereinafter may be called "ninth invention").

[21] A method of manufacturing a plasma reactor which includes a plasma generating electrode capable of generating plasma upon application of a voltage and can cause a gas to react by the plasma generated, the method comprising: forming tape-shaped first and second unfired ceramic formed bodies by tape-forming; printing a first conductor electrode on one surface of the resulting first unfired ceramic formed body to form an unfired ceramic formed body having an electrode; layering the resulting unfired ceramic formed body having an electrode and the second unfired ceramic formed body so as to cover the conductor electrode of the unfired ceramic formed body having an electrode to form an unfired multilayer structure; forming recesses and protrusions at each surface of the resulting unfired multilayer structure to form an unfired multilayer structure having recesses and protrusions; disposing a plate-shaped second conductor electrode on one surface of the resulting unfired multilayer structure having recesses and protrusions to form an unfired multilayer structure having an electrode; winding or folding one or more of the multilayer structures having an electrode to form a wound unfired multilayer structure; and firing the resulting wound unfired multilayer structure to form the plasma generating electrode (hereinafter may be called "tenth invention").

[22] A method of manufacturing a plasma reactor which includes a plasma generating electrode capable of generating plasma upon application of a voltage and can cause a gas to react by the plasma generated, the method comprising: forming tape-shaped first and second unfired ceramic formed bodies by tape-forming; printing a first conductor electrode on one surface of the resulting first unfired ceramic formed body to form an unfired ceramic formed body having an electrode; layering the resulting unfired ceramic formed body having an electrode and the second unfired ceramic formed body so as to cover the conductor electrode of the unfired ceramic formed body having an electrode to form an unfired multilayer structure; forming recesses and protrusions at one surface of the resulting unfired multilayer structure to form an unfired multilayer structure having recesses and protrusions; printing a second conductor electrode on the other surface of the resulting unfired multilayer structure having recesses and protrusions to form an unfired multilayer structure having an electrode; firing the resulting unfired multilayer structure having an electrode to form a multilayer structure; and layering two or more of the resulting multilayer structures to form the plasma generating electrode (hereinafter may be called "eleventh invention").

[23] A method of manufacturing a plasma reactor which includes a plasma generating electrode capable of generating plasma upon application of a voltage and can cause a gas to react by the plasma generated, the method comprising: forming tape-shaped first and second unfired ceramic formed bodies by tape-forming; printing a first conductor electrode on one surface of the resulting first unfired ceramic formed body to form an unfired ceramic formed body having an electrode; layering the resulting unfired ceramic formed body having an electrode and the second unfired ceramic formed body so as to cover the conductor electrode of the unfired ceramic formed body having an electrode to form an unfired multilayer structure; forming recesses and protrusions at one surface of the resulting unfired multilayer structure to form an unfired multilayer structure having recesses and protrusions; printing a second conductor electrode on the other surface of the resulting unfired multilayer structure having recesses and protrusions to form an unfired multilayer structure having an electrode; winding or folding one or more of the resulting unfired multilayer structure having an electrode to form a wound unfired multilayer structure; and firing the resulting wound unfired multilayer structure to form the plasma generating electrode (hereinafter may be called "twelfth invention").

[24] The method of manufacturing a plasma reactor as defined in [14] to [23], comprising forming recesses and protrusions at a surface of the first unfired ceramic formed body or the unfired multilayer structure by rotating a gear wheel in a shape of recesses and protrusions while pressing the gear wheel.

[25] The method of manufacturing a plasma reactor as defined in any of [14] to [24], comprising placing the plasma generating electrode in a conductive casing with a buffer material having conductive and elasticity interposed therebetween.

[26] The method of manufacturing a plasma reactor as defined in any of [14] to [25], wherein at least one material selected from the group consisting of cordierite, mullite, alumina, silicon nitride, SIALON, and zirconia is used as a material for the first and second unfired ceramic formed bodies.

[27] The method of manufacturing a plasma reactor as defined in any of [14] to [26], wherein the first and second unfired ceramic formed bodies are fired so that porosity after firing is 0.5 to 35%.

The plasma reactor according to the invention can thus generate uniform and stable plasma at low power consumption and reduce the passage resistance of the gas which passes through the plasma reactor.

BEST MODE FOR CARRYING OUT THE INVENTION

Embodiments of a plasma reactor and a method of manufacturing the same according to the invention are described below in detail with reference to the drawings. However, the invention should not be construed as being limited to the following embodiments. Various alterations, modifications, and improvements may be made within the scope of the invention based on knowledge of a person skilled in the art.

Figure 1:
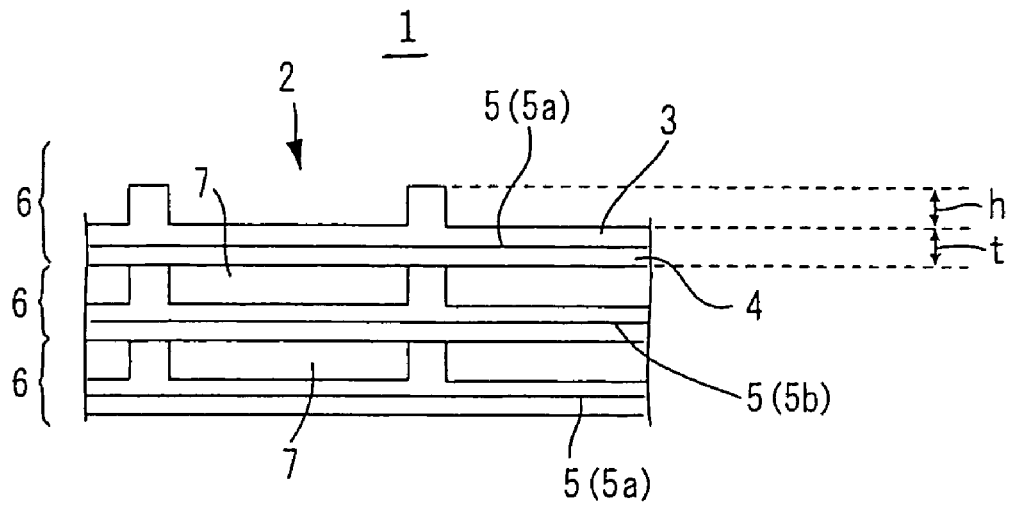
FIG. 1 is a cross-sectional diagram schematically showing one embodiment of a plasma reactor according to the invention (first invention).

A plasma reactor according to one embodiment of the invention (first invention) is described below. As shown in FIG. 1, a plasma reactor 1 according to the embodiment includes a plasma generating electrode 2 capable of generating plasma upon application of a voltage, and can cause a gas to react by the plasma generated, wherein the plasma generating electrode 2 is configured by layering two or more multilayer structures 6, each of the multilayer structures 6 including two tape-shaped ceramic formed bodies 3 and 4 and an electrically continuous film-shaped conductor electrode 5 held and disposed between the ceramic formed bodies 3 and 4, so that a plasma generating space 7 including a layer surface between the multilayer structures 6 is formed therein; and wherein the plasma can be generated in the plasma generating space 7 by discharging electricity between the conductor electrodes 5 adjacent to each other.

Figure 2:
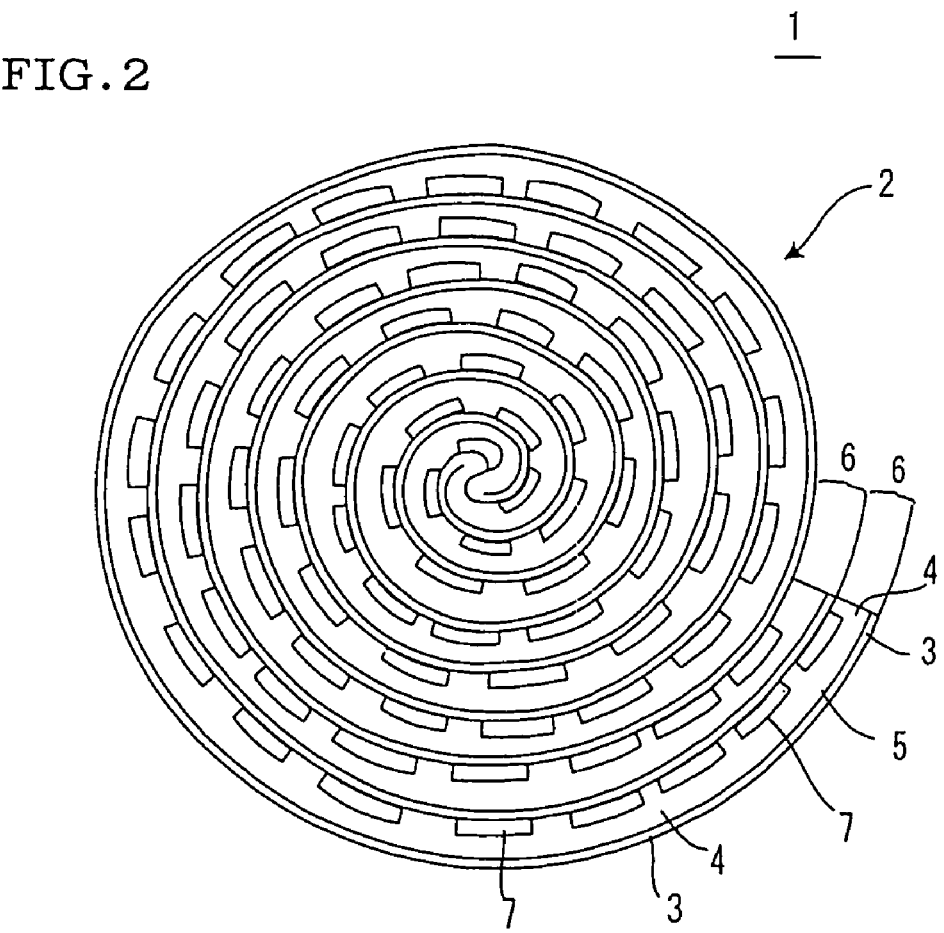
FIG. 2 is a cross-sectional diagram schematically showing another embodiment of the plasma reactor according to the invention (first invention).

In FIG. 1, the plasma generating electrode 2 is configured by layering two or more multilayer structures 6 so that the plasma generating space 7 including the layer surface between the multilayer structures 6 is formed therein. As shown in FIG. 2, the plasma generating electrode 2 may be configured by winding two or more (even number) multilayer structures 6, each of the multilayer structures 6 including two tape-shaped ceramic formed bodies 3 and 4 and the electrically continuous film-shaped conductor electrode 5 held and disposed between the ceramic formed bodies 3 and 4, so that the plasma generating space 7 including the layer surface between the multilayer structures 6 is formed therein. In addition, the plasma generating electrode 2 may be configured by folding as described later.

In the embodiment, as shown in FIGS. 1 and 2, recesses and protrusions are formed at one of two outer surfaces of the ceramic formed bodies 3 and 4, which make up the multilayer structure 6, other than the surfaces which hold the conductor electrode 5, and the recess formed in the surface of the ceramic formed body 3 or 4 forms the plasma generating space 7.

This configuration enables uniform and stable plasma to be generated at low power consumption and reduces the passage resistance of a gas which passes through the plasma reactor. Since the conductor electrode 5 is covered with the ceramic formed bodies 3 and 4, oxidation and corrosion of the conductor electrode 5 can be effectively prevented.

Figure 73:
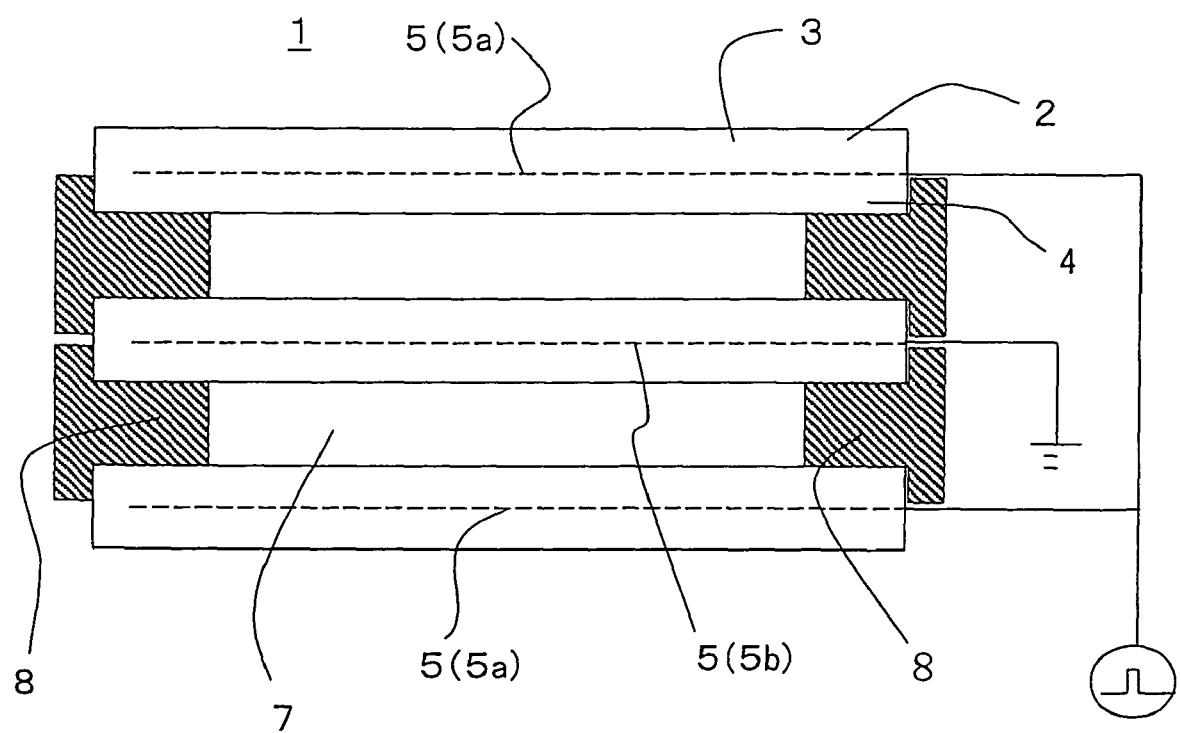
FIG. 73 is a cross-sectional diagram schematically showing another embodiment of the plasma reactor according to the invention (first invention).

In the plasma reactor 1 according to the embodiment, since it suffices that two or more multilayer structures 6 be layered so that the plasma generating space 7 including the layer surface is formed therein, gap members 8 having a predetermined thickness may be disposed between the opposite plasma generating electrodes 2, as shown in FIG. 73, without forming recesses and protrusions at the surfaces of the ceramic formed bodies 3 and 4, for example. The gap formed by the gap members 8 functions as the plasma generating space 7.

As shown in FIGS. 1 and 2, in the plasma reactor 1 according to the embodiment, the conductor electrodes 5 disposed in layers alternately serve as a pulse electrode 5a to which a voltage for generating plasma is applied and a ground electrode 5b for grounding the plasma generating electrode 2. Therefore, the plasma generating electrode 2 according to the embodiment is used in a state in which the conductor electrodes 5 (pulse electrodes 5a) are connected with a power supply so that the voltage can be applied to every other conductor electrode 5 disposed in layers, and the conductor electrode 5 (ground electrode 5b) which is not connected with the power supply is connected to ground or the like.

In the embodiment, it is preferable that the conductor electrode 5 be printed on the ceramic formed bodies 3 and 4. According to this configuration, the conductor electrode 5 can be easily disposed and the conductor electrode 5 having a small thickness can be formed, whereby a reduction in the size of the plasma reactor 1 according to the embodiment can be realized. A part or the entirety of the two surfaces of the ceramic formed bodies 3 and 4 other than the surfaces which hold the conductor electrode 5 may be coated with a catalyst (catalyst support coating layer containing at least one compound selected from the group consisting of $Al_2O_3$, $CeO_2$, and $ZrO_2$ supporting at least one metal selected from the group consisting of Pt, Pd, Rh, K, Ba, Li, V, and Na).

The plasma reactor 1 according to the embodiment may be installed and used in a combustion gas exhaust system upstream of a filter for trapping particulate matter such as soot contained in exhaust gas, for example. In more detail, the plasma reactor 1 may be used to oxidize nitrogen monoxide (NO) contained in the exhaust gas to produce nitrogen dioxide ($NO_2$) required for filter regeneration. The plasma reactor 1 may also be suitably used as an ozonizer which produces ozone by reacting oxygen contained in air or the like. The plasma reactor 1 may be installed upstream of an exhaust gas catalytic converter, and may be used to convert NO into $NO_2$ and produce reactive species (ozone and OH) or the like to significantly improve the purification efficiency (e.g. for HC, CO, and $NO_x$) of the downstream converter. In the application in which the electrode surface of the plasma reactor 1 is coated with the catalyst, the plasma reactor 1 can also function as the catalytic converter.

The ceramic formed bodies 3 and 4 used in the embodiment preferably include at least one material selected from the group consisting of cordierite, mullite, alumina, silicon nitride, SIALON, and zirconia. The ceramic formed bodies 3 and 4 may further include an organic solvent such as toluene, a binder such as a butyral resin or a cellulose resin, or a plasticizer such as dioctyl phthalate (DOP) or diethyl phthalate (DBP). When using cordierite as the material for the ceramic formed bodies 3 and 4, the resulting ceramic formed bodies 3 and 4 exhibit excellent thermal shock resistance. There are no specific limitations to the thicknesses of the ceramic formed bodies 3 and 4. The thicknesses of the ceramic formed bodies 3 and 4 are preferably 0.2 to 6 mm. If the thicknesses of the ceramic formed bodies 3 and 4 are less than 0.2 mm, the pulse electrode 5a may not be electrically insulated from the ground electrode 5b. If the thicknesses of the ceramic formed bodies 3 and 4 are greater than 6 mm, plasticity of the ceramic formed bodies 3 and 4 may be hindered, whereby cracks may occur due to an operation when deforming the shape such as winding.

In the embodiment, the porosity of the ceramic formed bodies 3 and 4 is preferably 0.5 to 35%, and still more preferably 0.5 to 10%. This configuration enables plasma to be efficiently generated between two adjacent conductor electrodes 5 disposed between the ceramic formed bodies 3 and 4, that is, between the pulse electrode 5a and the ground electrode 5b, whereby a reduction in energy consumption of the plasma reactor 1 can be realized.

As the material for the conductor electrode 5, a highly conductive metal is preferably used. For example, a metal containing at least one component selected from the group consisting of tungsten, silver, platinum, gold, iron, copper, and cermet can be given as a preferable example.

The thickness of the conductor electrode 5 is preferably 0.01 to 0.1 mm, and still more preferably 0.01 to 0.015 mm in order to reduce the size of the plasma generating electrode 2 and reduce the passage resistance of a gas, for example. When forming the conductor electrode 5 by printing, it is preferable to form the conductor electrode 5 by screen printing.

Figure 3:
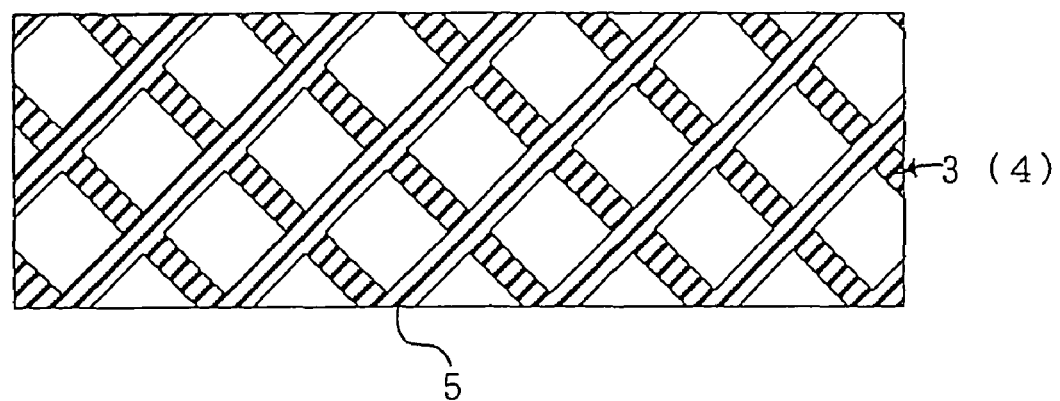
FIG. 3 is a plan view showing the shape of a conductor electrode used in one embodiment of the plasma reactor according to the invention (first invention).
Figure 4:
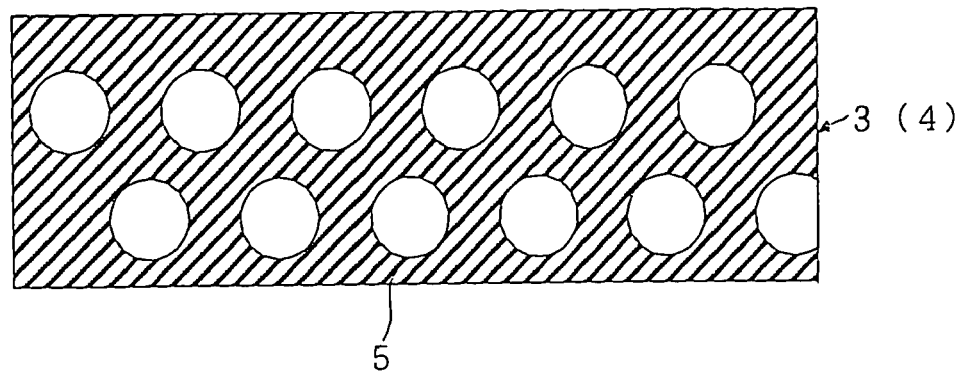
FIG. 4 is a plan view showing another shape of the conductor electrode used in one embodiment of the plasma reactor according to the invention (first invention).
Figure 5:
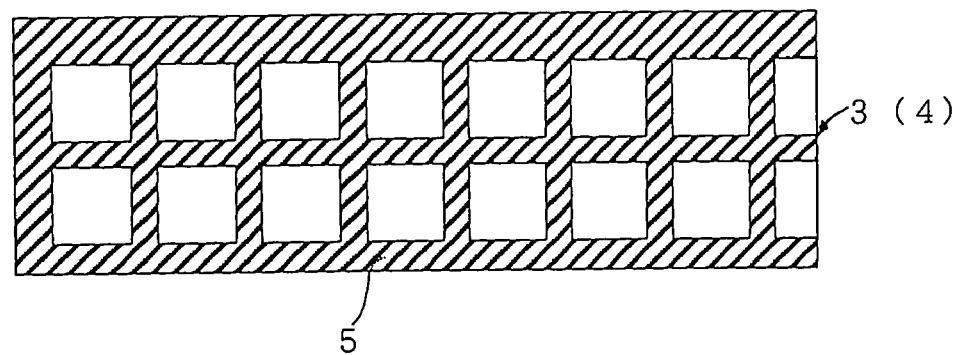
FIG. 5 is a plan view showing still another shape of the conductor electrode used in one embodiment of the plasma reactor according to the invention (first invention).
Figure 6:
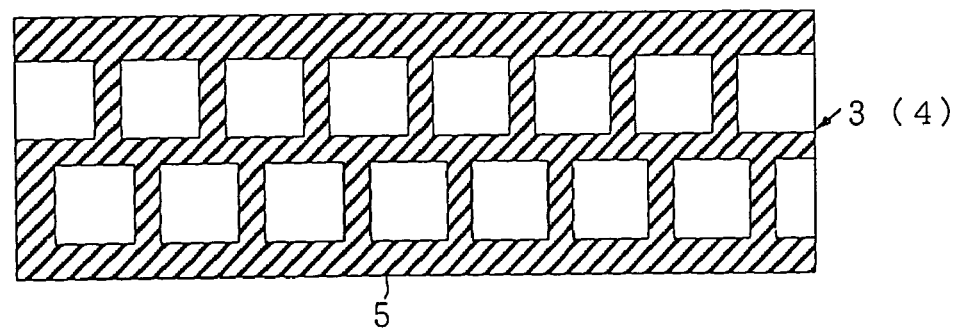
FIG. 6 is a plan view showing yet another shape of the conductor electrode used in one embodiment of the plasma reactor according to the invention (first invention).

The shape of the conductor electrode 5 is not particularly limited insofar as electricity can be discharged between adjacent conductor electrodes 5 to effectively generate plasma in the plasma generating space 7. For example, the conductor electrode 5 may be formed to cover the entire surface of one of the ceramic formed bodies 3 and 4, or may be formed in the shape of a mesh as shown in FIG. 3, or may have a shape in which openings in the shape of a polygon, circle, or ellipse are disposed in a lattice arrangement or a staggered arrangement as shown in FIGS. 4 to 6. The conductor electrode 5 having the above-mentioned shape may be easily formed by screen-printing a metal containing at least one component selected from the group consisting of tungsten, silver, platinum, gold, iron, copper, and cermet, which is prepared as a paste by mixing with an organic solvent and a plasticizer, on the surfaces of the ceramic formed bodies 3 and 4.

As shown in FIG. 1, it is preferable in the embodiment that the relationship between a thickness t of the thin section of the plasma generating electrode 2 and a height h of the protrusion formed on the surface of the multilayer structure 6 which makes up the plasma generating electrode 2 satisfy the following equation (2).

$$0.7t < h \qquad (2)$$

This configuration makes it possible to cause a gas which passes through the plasma generating space 7 to react with high efficiency. Moreover, since such a plasma generating electrode 2 exhibits excellent mechanical strength, the plasma reactor can be installed in an automotive exhaust system or the like to which impact is always applied. If the relationship between the thickness t of the thin section of the plasma generating electrode 2 and the height h of the protrusion formed on the surface of the multilayer structure 6 which makes up the plasma generating electrode 2 does not satisfy the equation (2), the structural strength to withstand an external force may be significantly decreased. It is still more preferable that the height h of the protrusion formed on the surface of the multilayer structure 6 which makes up the plasma generating electrode 2 be three times or less of the thickness t of the thin section of the plasma generating electrode 2, although the invention is not limited thereto. If the height h of the protrusion is greater than three times the thickness t of the thin section of the plasma generating electrode 2, the structural strength may become insufficient.

In the embodiment, it is preferable that the thickness t of the thin section of the plasma generating electrode 2 be 0.2 to 6 mm. This configuration enables a plasma field exhibiting excellent reactivity to be generated and reduces the passage resistance of the gas. If the thickness t of the thin section of the plasma generating electrode 2 is less than 0.2 mm, the structural strength to withstand an external force may be insufficient. If the thickness t exceeds 6 mm, since the rigidity (Young's modulus) of the structure becomes too high, the thermal shock resistance may be decreased.

Figure 7:
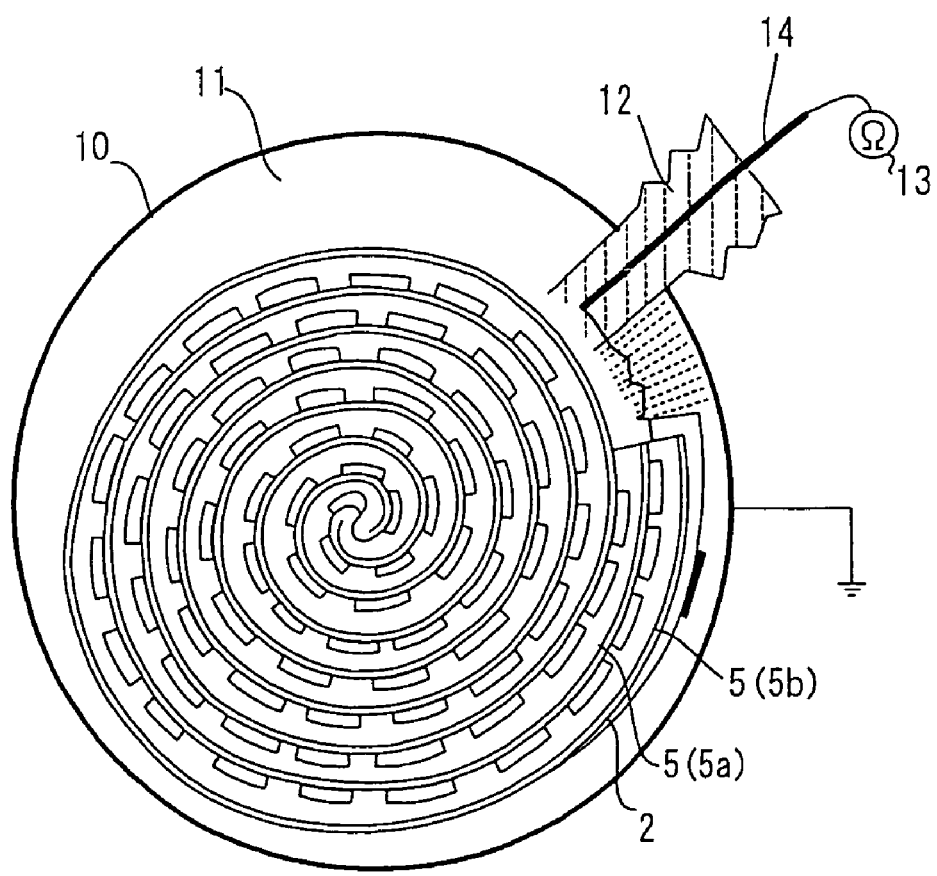
FIG. 7 is a cross-sectional diagram schematically showing still another embodiment of a plasma reactor according to the invention (first invention).

As shown in FIG. 7, in the plasma reactor 1 according to the embodiment, it is preferable that the plasma generating electrode 2 be placed in a conductive casing 10 with a buffer material 11 having conductivity and elasticity interposed therebetween. Since the plasma generating electrode 2 is provided in a state in which the conductive casing 10 is electrically connected with the conductor electrode 5 serving as the ground electrode 5b, the plasma reactor 1 according to the embodiment can be easily grounded. A stainless steel metal wire mesh or the like may be suitably used as the buffer material 11. Damage to the plasma generating electrode 2 can be effectively prevented by placing the plasma generating electrode 2 in the conductive casing 10 with the buffer material 11 provided therebetween. The conductor electrode 5 serving as the pulse electrode 5a is electrically connected with a power supply 13 for applying a voltage through a wiring 14 covered with an insulating member 12 in a state in which the conductor electrode 5 is electrically insulated from the buffer material 11.

There are no specific limitations to the material for the casing 10 used in the embodiment. For example, it is preferable to use ferritic stainless steel having excellent conductivity, being lightweight and inexpensive, and showing only a small amount of deformation due to thermal expansion as the material for the casing 10.

In the embodiment, it is preferable that the current supplied from the power supply 13 be a direct current at a voltage of 1 kV or more, a pulse current having a peak voltage of 1 kV or more and a pulse rate per second of 1000 or more (1 kHz or more), an alternating current having a peak voltage of 1 kV or more and a pulse rate per second of 1000 or more (1 kHz or more), or a current generated by superimposing two of these currents. This configuration enables plasma to be efficiently generated.

Figure 8:
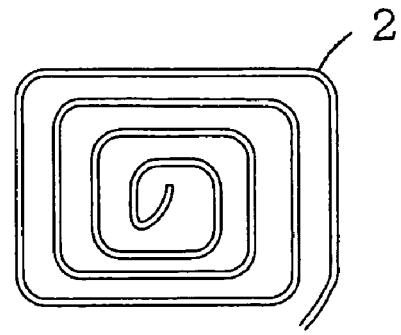
FIG. 8 is a cross-sectional diagram showing a plasma generating electrode used in another embodiment of the plasma reactor according to the invention (first invention).
Figure 9:
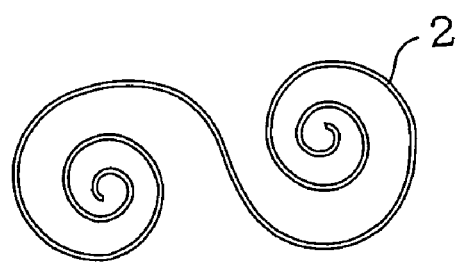
FIG. 9 is a cross-sectional diagram showing another plasma generating electrode used in another embodiment of the plasma reactor according to the invention (first invention).

FIG. 7 illustrates the plasma generating electrode 2 which is wound so that the cross-sectional shape is a spiral. However, the invention is not limited thereto. The embodiment also includes the plasma generating electrode 2 which is wound so that at least a part of the cross-sectional shape is linear as shown in FIG. 8, and the plasma generating electrode 2 which is wound so that the cross section is in the shape of the figure "8" as shown in FIG. 9, for example.

Figure 10:
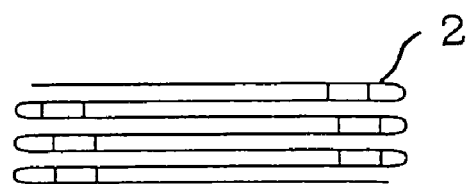
FIG. 10 is a cross-sectional diagram showing still another plasma generating electrode used in another embodiment of the plasma reactor according to the invention (first invention).
Figure 11:
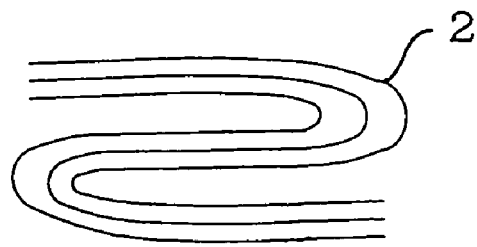
FIG. 11 is a cross-sectional diagram showing yet another plasma generating electrode used in another embodiment of the plasma reactor according to the invention (first invention).

For example, the plasma generating electrode 2 in which two or more multilayer structures 6 (see FIG. 7) are flatly layered may be folded as shown in FIG. 10, or the plasma generating electrode 2 in which two or more multilayer structures 6 (see FIG. 7) are flatly layered may be wound as shown in FIG. 11.

Figure 74:
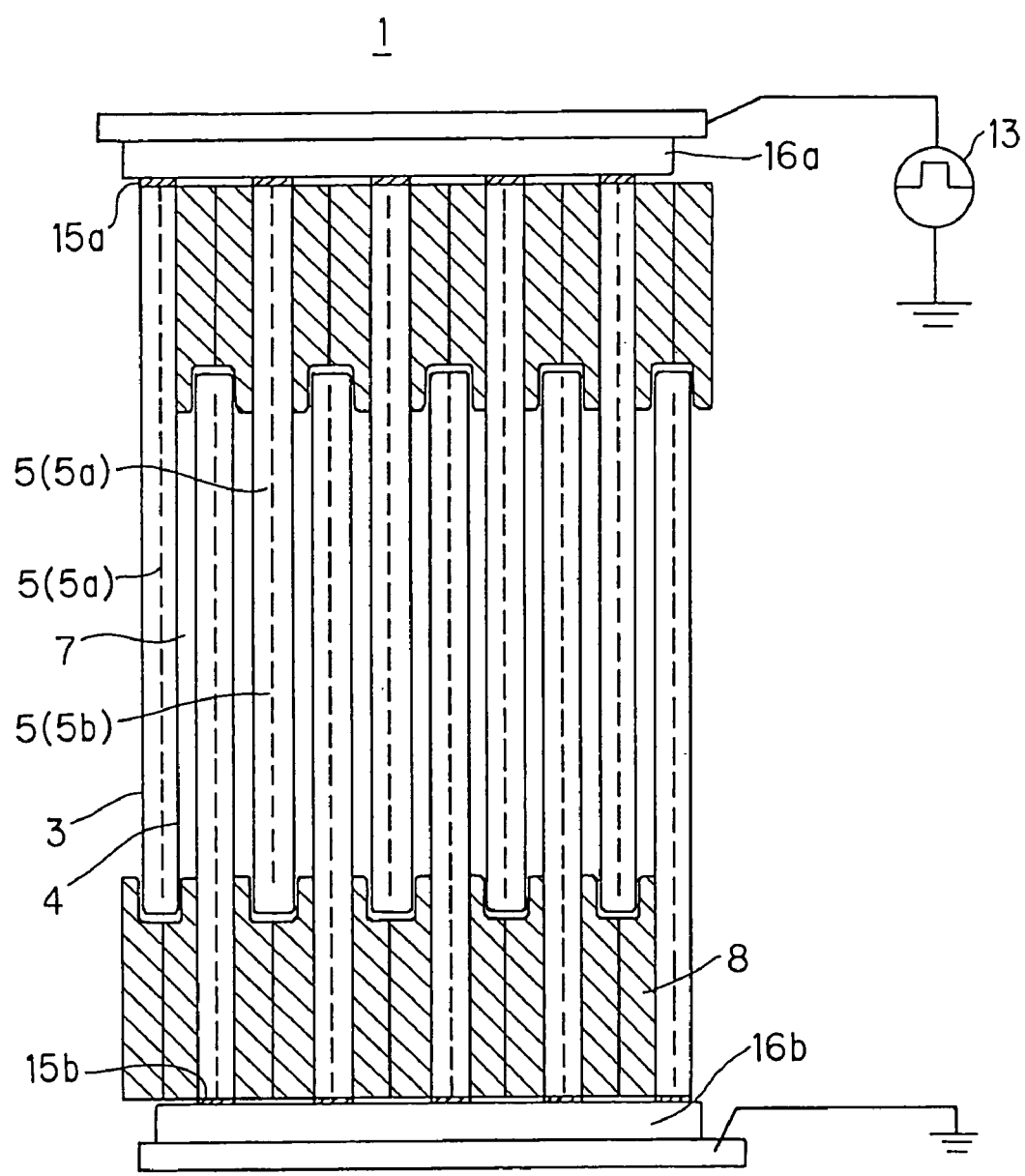
FIG. 74 is a cross-sectional diagram schematically showing still another embodiment of the plasma reactor according to the invention (first invention).

When electrically connecting the plasma reactor 1 shown in FIG. 73 with the power supply 13, as shown in FIG. 74, it is preferable to dispose a connection terminal 15a, which is electrically connected with the pulse electrode 5a, at one end of each plasma generating electrode 2 in which the pulse electrode 5a is disposed, dispose a current collector member 16a for simultaneously applying current to each connection terminal 15a, and electrically connect the current collector member 16a with the power supply 13. In this case, it is preferable to dispose a connection terminal 15b, which is electrically connected with the pulse electrode 5b, at the other end of each plasma generating electrode 2 in which the pulse electrode 5b is disposed, dispose a current collector member 16b for simultaneously applying current to each connection terminal 15b, and connect the current collector member 16b with ground. In FIG. 74, the connection terminal 15a of the pulse electrode 5a and the connection terminal 15b of the ground electrode 5b are disposed at opposite ends of the plasma generating electrode 2. However, the connection terminal 15a and the connection terminal 15b may be disposed at the end on the same side.

Figure 75:
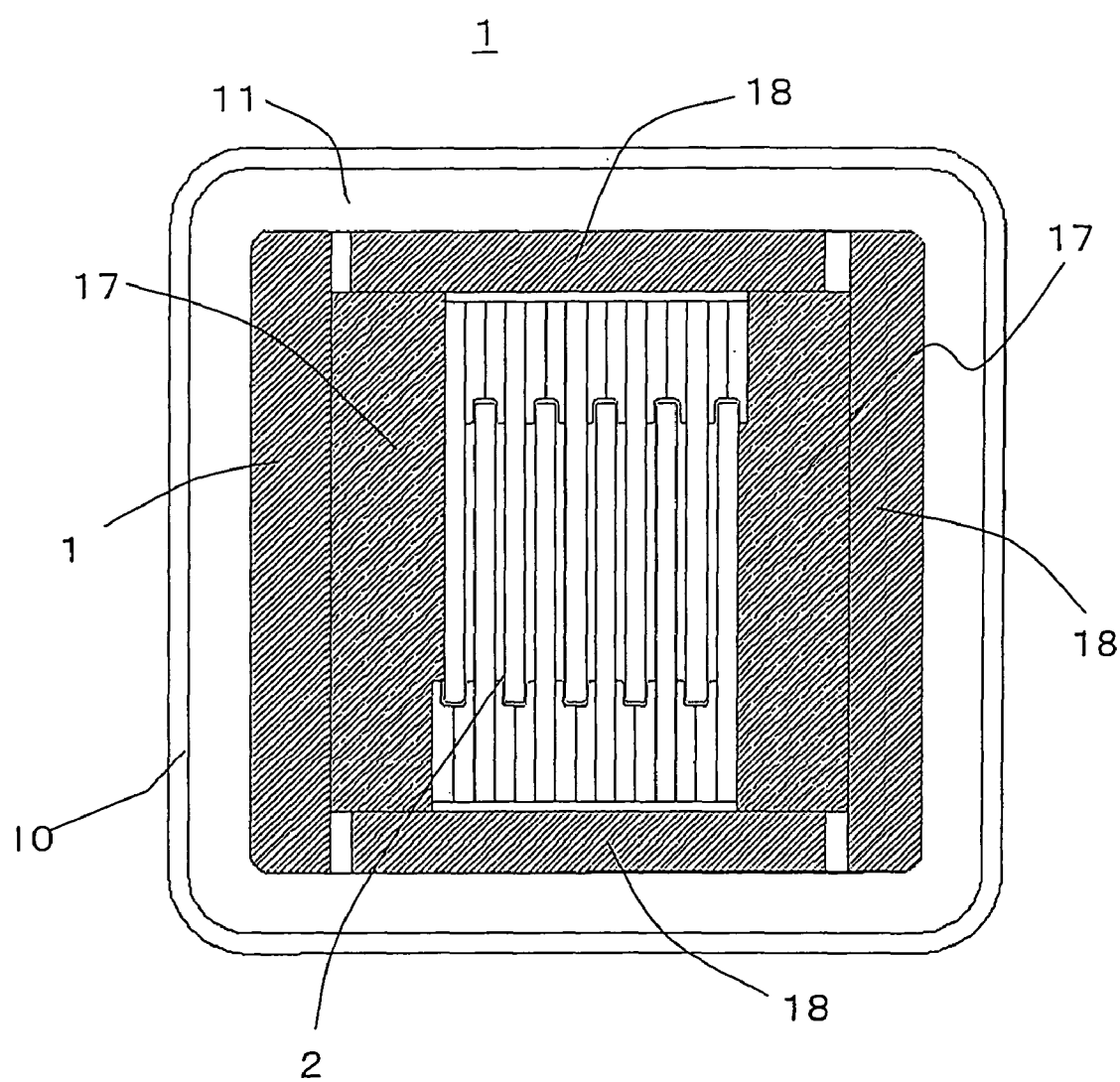
FIG. 75 is a cross-sectional diagram schematically showing still another embodiment of the plasma reactor according to the invention (first invention).

In the plasma reactor according to the embodiment, the plasma reactor 1 as shown in FIG. 74 may be provided in a conductive casing. As a preferable example, the plasma reactor 1 as shown in FIG. 75 can be given, in which each end of the plasma generating electrodes 2 disposed opposite to each other is secured using a holding member 17, four surfaces (top, bottom, right, and left in FIG. 75), other than the surface through which exhaust gas or the like passes, are secured using four frame members 18, and the plasma generating electrodes 2, the holding member 17, and the frame members 18 are provided in the casing 10. In this case, it is preferable provide the buffer material 11 having elasticity between the frame member 18 and the casing 10. As the buffer material 11, a material obtained by compressing a mat containing alumina or silica may be suitably used. In FIGS. 73 to 75, elements configured in the same manner as the elements shown in FIGS. 1 and 2 are indicated by the same symbols, and description of these elements is omitted.

Figure 12:
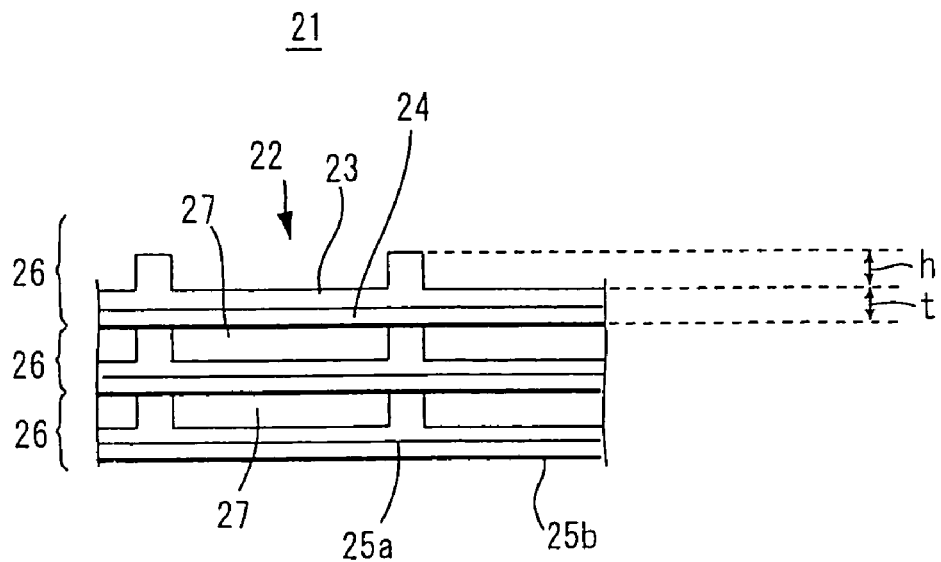
FIG. 12 is a cross-sectional diagram schematically showing one embodiment of a plasma reactor according to the invention (second invention).

One embodiment of a plasma reactor according to the invention (second invention) is described below. As shown in FIG. 12, a plasma reactor 21 according to the embodiment includes a plasma generating electrode 22 capable of generating plasma upon application of a voltage, and can cause a gas to react by the plasma generated, wherein the plasma generating electrode 22 is configured by layering two or more multilayer structures 26, each of the multilayer structures 26 including two tape-shaped ceramic formed bodies 23 and 24, an electrically continuous film-shaped first conductor electrode 25a held and disposed between the ceramic formed bodies 23 and 24, and an electrically continuous film-shaped or plate-shaped second conductor electrode 25b disposed on one of two outer surfaces of the ceramic formed bodies 23 and 24 other than the surfaces which hold the first conductor electrode 25a, so that a plasma generating space 27 including a layer surface between the multilayer structures 26 is formed therein; and wherein the plasma can be generated in the plasma generating space 27 by discharging electricity between the adjacent first and second conductor electrodes 25a and 25b.

Figure 13:
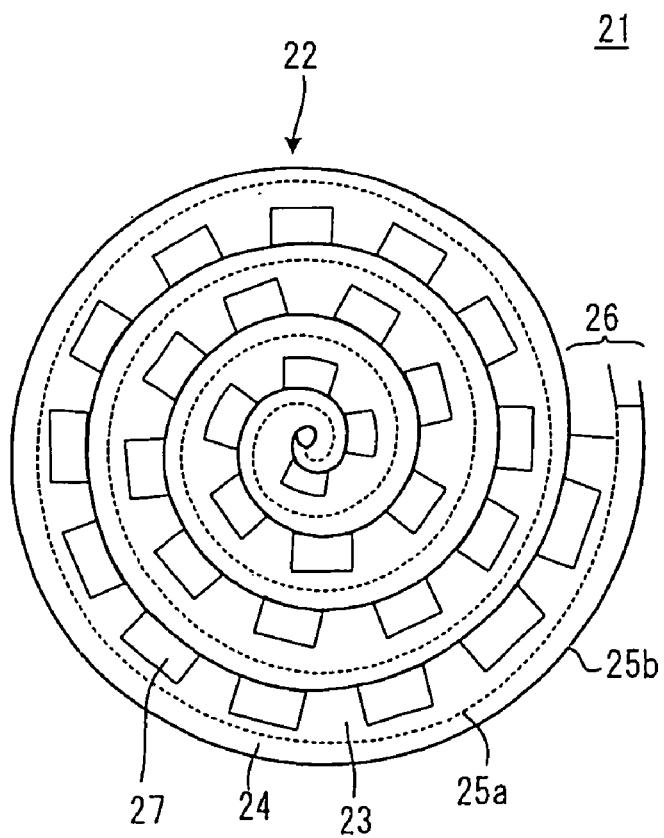
FIG. 13 is a cross-sectional diagram schematically showing another embodiment of the plasma reactor according to the invention (second invention).

In FIG. 12, the plasma generating electrode 22 is configured by layering two or more multilayer structures 26 so that the plasma generating space 27 including the layer surface between the multilayer structures 26 is formed therein. As shown in FIG. 13, the plasma generating electrode 22 may be configured by winding one or more of the multilayer structure 26, including two tape-shaped ceramic formed bodies 23 and 24, the electrically continuous film-shaped first conductor electrode 25a held and disposed between the ceramic formed bodies 23 and 24, and the electrically continuous film-shaped or plate-shaped second conductor electrode 25b disposed on one of two outer surfaces of the ceramic formed bodies 23 and 24 other than the surfaces which hold the first conductor electrode 25a, so that the plasma generating space 27 is formed therein. In addition, the plasma generating electrode 22 may be configured by folding.

This configuration enables uniform and stable plasma to be generated at low power consumption and reduces the passage resistance of a gas which passes through the plasma reactor. Since the first conductor electrode 25a is covered with the ceramic formed bodies 23 and 24, oxidation and corrosion of the first conductor electrode 25a can be effectively prevented.

In the embodiment, it is preferable that recesses and protrusions be formed at one of two outer surfaces of the ceramic formed bodies 23 and 24, which make up the multilayer structure 26, other than the surfaces which hold the first conductor electrode 25a, and the recess formed in the surface of the ceramic formed body 23 or 24 form the plasma generating space 27. FIGS. 12 and 13 illustrate the multilayer structure 26 in which recesses and protrusions are formed at either one of two outer surfaces of the ceramic formed bodies 23 and 24 other than the surfaces which hold the first conductor electrode 25a.

In the plasma reactor 21 according to the embodiment, one of the first conductor electrode 25a and the second conductor electrode 25b functions as a pulse electrode to which a voltage for generating plasma is applied, and the other functions as a ground electrode connected with ground or the like.

In the embodiment, it is preferable that the first conductor electrode 25a and/or the second conductor electrode 25b be printed on the ceramic formed bodies 23 and 24. According to this configuration, the first conductor electrode 25a and/or the second conductor electrode 25b can be easily disposed and the first conductor electrode 25a and/or the second conductor electrode 25b having a small thickness can be formed, whereby a reduction in the size of the plasma reactor 21 according to the embodiment can be realized. The ceramic formed body may be coated with a catalyst in the same manner as in the first invention.

The plasma reactor 21 according to the embodiment may be installed and used in a combustion gas exhaust system upstream of a filter for trapping particulate matter such as soot contained in exhaust gas, for example. In more detail, the plasma reactor 21 may be used to oxidize nitrogen monoxide (NO) contained in exhaust gas to produce nitrogen dioxide ($NO_2$) required for filter regeneration. The plasma reactor 21 may also be suitably used as an ozonizer which produces ozone by reacting oxygen contained in air or the like. The plasma reactor 21 may be installed upstream of an exhaust gas catalytic converter, and may be used to convert NO into $NO_2$ and produce reactive species (ozone and OH) or the like to significantly improve the purification efficiency (e.g. for HC, CO, and $NO_x$) of the downstream converter. In the application in which the electrode surface of the plasma reactor 21 is coated with the catalyst, the plasma reactor 21 can also function as the catalytic converter.

As the ceramic formed bodies 23 and 24 used in the embodiment, ceramic formed bodies configured in the same manner as the ceramic formed bodies 3 and 4 (see FIG. 1) described in the embodiment of the plasma reactor of the first invention may be suitably used.

As the material for the first and second conductor electrodes 25a and 25b, a highly conductive metal is preferably used. For example, a metal containing at least one component selected from the group consisting of tungsten, silver, platinum, gold, iron, copper, and cermet can be given as a preferable example. In the case of disposing the first and second conductor electrodes 25a and 25b by printing, the first and second conductor electrodes 25a and 25b may be easily formed by screen-printing the above-mentioned metal prepared as a paste on the surfaces of the ceramic formed bodies 23 and 24.

The thicknesses of the first and second conductor electrodes 25a and 25b according to the embodiment are preferably 0.01 to 0.1 mm, and still more preferably 0.01 to 0.015 mm in order to reduce the size of the plasma generating electrode 22 and reduce the passage resistance of the gas, for example. When forming the first conductor electrode 25a and/or the second conductor electrode 25b by printing, it is preferable to form the first conductor electrode 25a and/or the second conductor electrode 25b by screen printing.

The shape of the first and second conductor electrodes 25a and 25b is not particularly limited insofar as electricity can be discharged between the adjacent first and second conductor electrodes 25a and 25b to effectively generate plasma in the plasma generating space 27. For example, the first and second conductor electrodes 25a and 25b may be formed to cover the entire surface of one of the ceramic formed bodies 23 and 24, or may be formed in the shape of a mesh, or may have a shape in which openings in the shape of a polygon, circle, or ellipse are disposed in a lattice arrangement or a staggered arrangement in the same manner as the conductor electrode 5 shown in FIGS. 3 to 6.

In the embodiment, it is preferable that the relationship between a thickness t of the thin section of the plasma generating electrode 22 and a height h of the protrusion formed on the surface of the multilayer structure 26 which makes up the plasma generating electrode 32 satisfy the following equation (3).

$$0.7t < h \tag{3}$$

This configuration makes it possible to cause a gas which passes through the plasma generating space 27 to react with high efficiency. Moreover, since the plasma generating electrode 22 configured as described above exhibits excellent mechanical strength, the plasma reactor 21 can be installed in an automotive exhaust system or the like to which impact is always applied. If the relationship between the thickness t of the thin section of the plasma generating electrode 22 and the height h of the protrusion formed on the surface of the multilayer structure 26 which makes up the plasma generating electrode 22 does not satisfy the equation (2), the structural strength may be decreased. It is still more preferable that the height h of the protrusion formed on the surface of the multilayer structure 26 which makes up the plasma generating electrode 22 be three times or less of the thickness t of the thin section of the plasma generating electrode 22, although the invention is not limited thereto. If the height h of the protrusion is greater than three times the thickness t of the thin section of the plasma generating electrode 22, the structural strength may become insufficient.

In the embodiment, it is preferable that the thickness t of the thin section of the plasma generating electrode 22 be 0.2 to 6 mm. This configuration enables a plasma field exhibiting excellent reactivity to be generated and reduces the passage resistance of the gas. If the thickness t of the thin section of the plasma generating electrode 22 is less than 0.2 mm, the structural strength may be decreased. If the thickness t exceeds 6 mm, since the rigidity of the structure becomes too high, the thermal shock resistance may be decreased.

Figure 14:
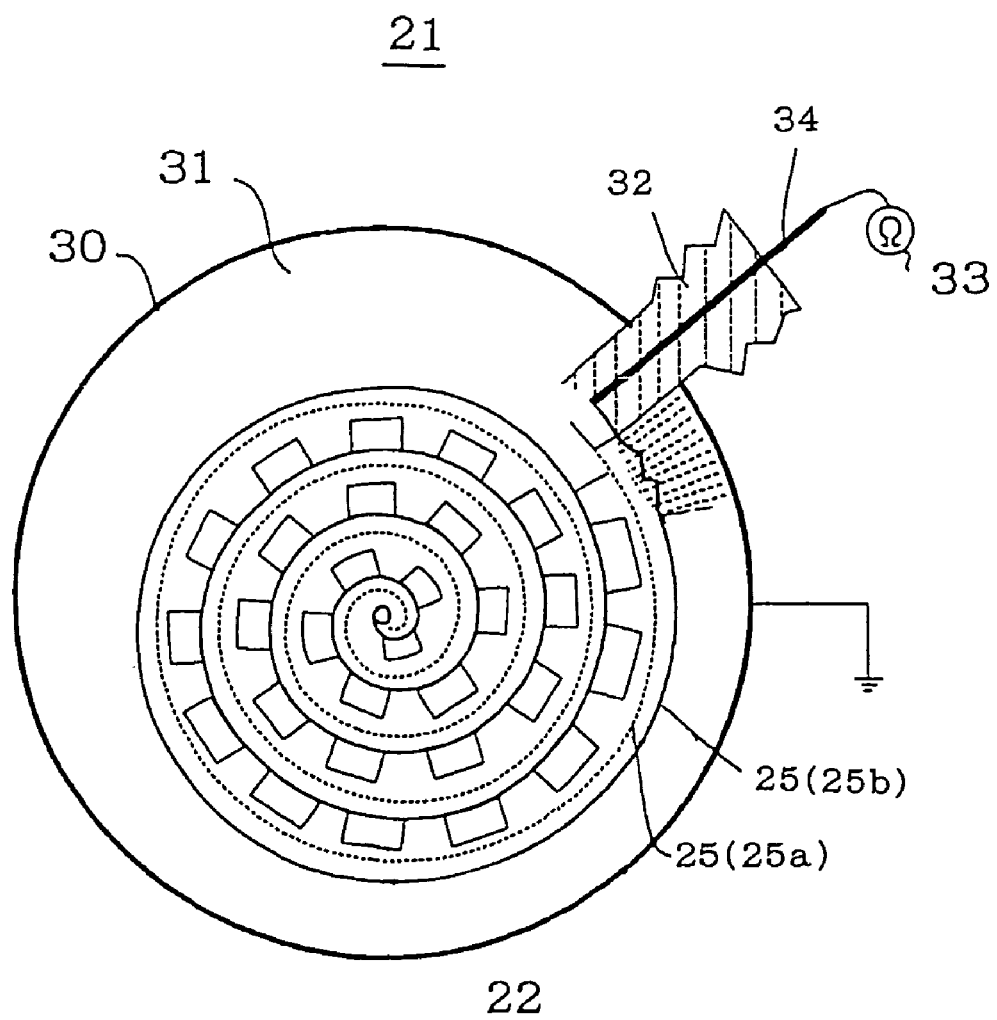
FIG. 14 is a cross-sectional diagram schematically showing still another embodiment of the plasma reactor according to the invention (second invention).

As shown in FIG. 14, in the plasma reactor 21 according to the embodiment, it is preferable that the plasma generating electrode 22 be placed in a conductive casing 30 with a buffer material 31 having conductivity and elasticity interposed therebetween. In this case, since the conductive casing 30 is electrically connected with the second conductor electrode 25b which functions as the ground electrode by using the second conductor electrode 25b as the ground electrode, the plasma reactor 21 according to the embodiment can be easily grounded. A metal wire mesh or the like may be suitably used as the buffer material 31. Damage to the plasma generating electrode 22 can be effectively prevented by placing the plasma generating electrode 22 in the conductive casing 30 with the buffer material 31 provided therebetween. The first conductor electrode 25a serving as the pulse electrode is electrically connected with a power supply 33 for applying a voltage through a wiring 34 covered with an insulating member 32 in a state in which the first conductor electrode 25a is electrically insulated from the buffer material 31. As the power supply 33, the power supply 13 of the plasma reactor 1 shown in FIG. 7 may be suitably used.

There are no specific limitations to the material for the casing 30 used in the embodiment. For example, it is preferable to use ferritic stainless steel having excellent conductivity, being lightweight and inexpensive, and showing only a small amount of deformation due to thermal expansion as the material for the casing 30.

Figure 15:
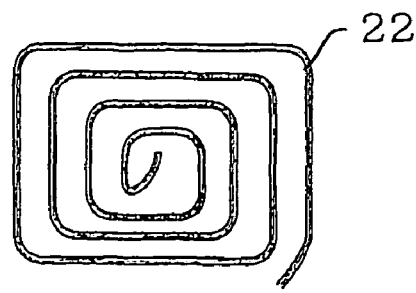
FIG. 15 is a cross-sectional diagram showing a plasma generating electrode used in another embodiment of the plasma reactor according to the invention (second invention).
Figure 16:
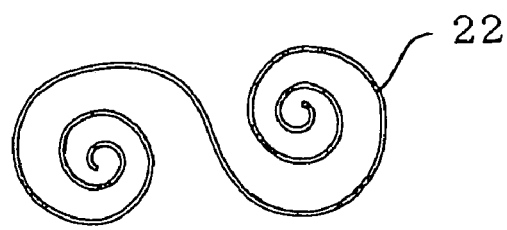
FIG. 16 is a cross-sectional diagram showing another plasma generating electrode used in another embodiment of the plasma reactor according to the invention (second invention).
Figure 17:
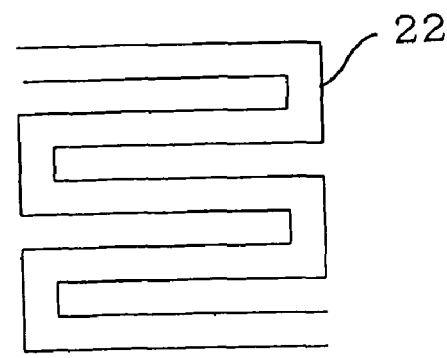
FIG. 17 is a cross-sectional diagram showing still another plasma generating electrode used in another embodiment of the plasma reactor according to the invention (second invention).
Figure 18:
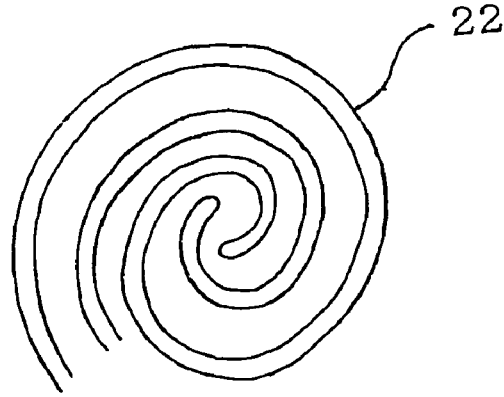
FIG. 18 is a cross-sectional diagram showing yet another plasma generating electrode used in another embodiment of the plasma reactor according to the invention (second invention).

The plasma generating electrode 22 used in the embodiment is not limited to the plasma generating electrode which is wound so that the cross-sectional shape is a spiral as shown in FIG. 14. The plasma generating electrode 22 which is wound so that at least a part of the cross-sectional shape is linear as shown in FIG. 15, the plasma generating electrode 22 which is wound so that the cross section in the shape of the figure "8" as shown in FIG. 16, the plasma generating electrode 22 in which one or more multilayer structures are folded as shown in FIG. 17, and the plasma generating electrode 22 in which one or more multilayer structures are folded and wound in a predetermined shape as shown in FIG. 18 may also be used.

Figure 19:
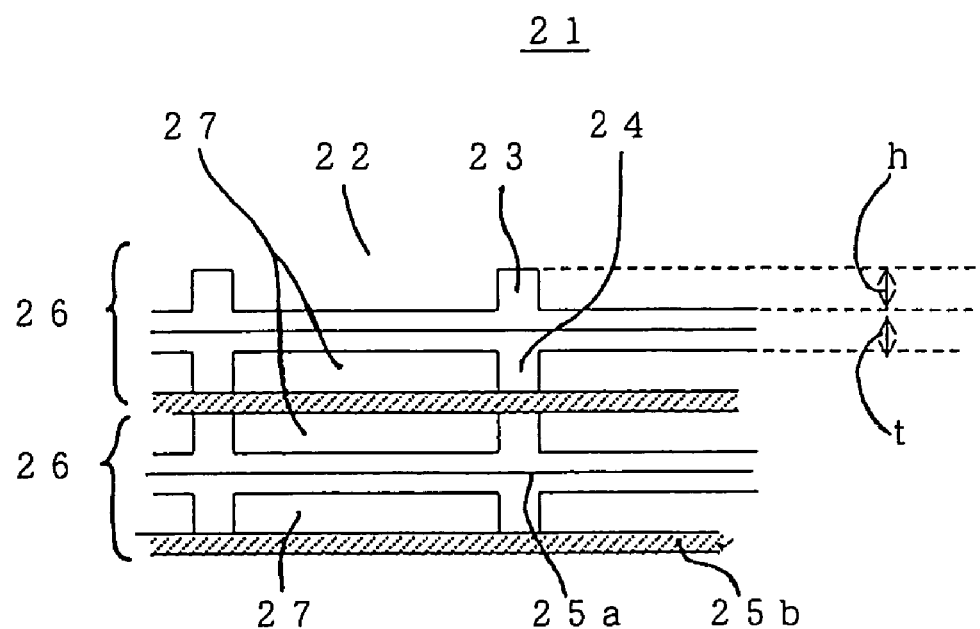
FIG. 19 is a cross-sectional diagram schematically showing still another embodiment of the plasma reactor according to the invention (second invention).

Another embodiment of the plasma reactor according to the invention (second invention) is described below. As shown in FIG. 19, the plasma reactor 21 according to the embodiment includes the plasma generating electrode 22 capable of generating plasma upon application of a voltage and can cause a gas to react by the plasma generated, wherein the plasma generating electrode 22 is configured by layering two or more multilayer structures 26, each of the multilayer structures 26 including two tape-shaped ceramic formed bodies 23 and 24, the electrically continuous film-shaped first conductor electrode 25a disposed between the ceramic formed bodies 23 and 24, and the electrically continuous film-shaped or plate-shaped second conductor electrode 25b held and disposed on one of two outer surfaces of the ceramic formed bodies 23 and 24 other than the surfaces which hold the first conductor electrode 25a, so that the plasma generating space 27 including a layer surface between the multilayer structures 26 is formed therein; and wherein the plasma can be generated in the plasma generating space 27 by discharging electricity between the adjacent first and second conductor electrodes 25a and 25b.

Figure 20:
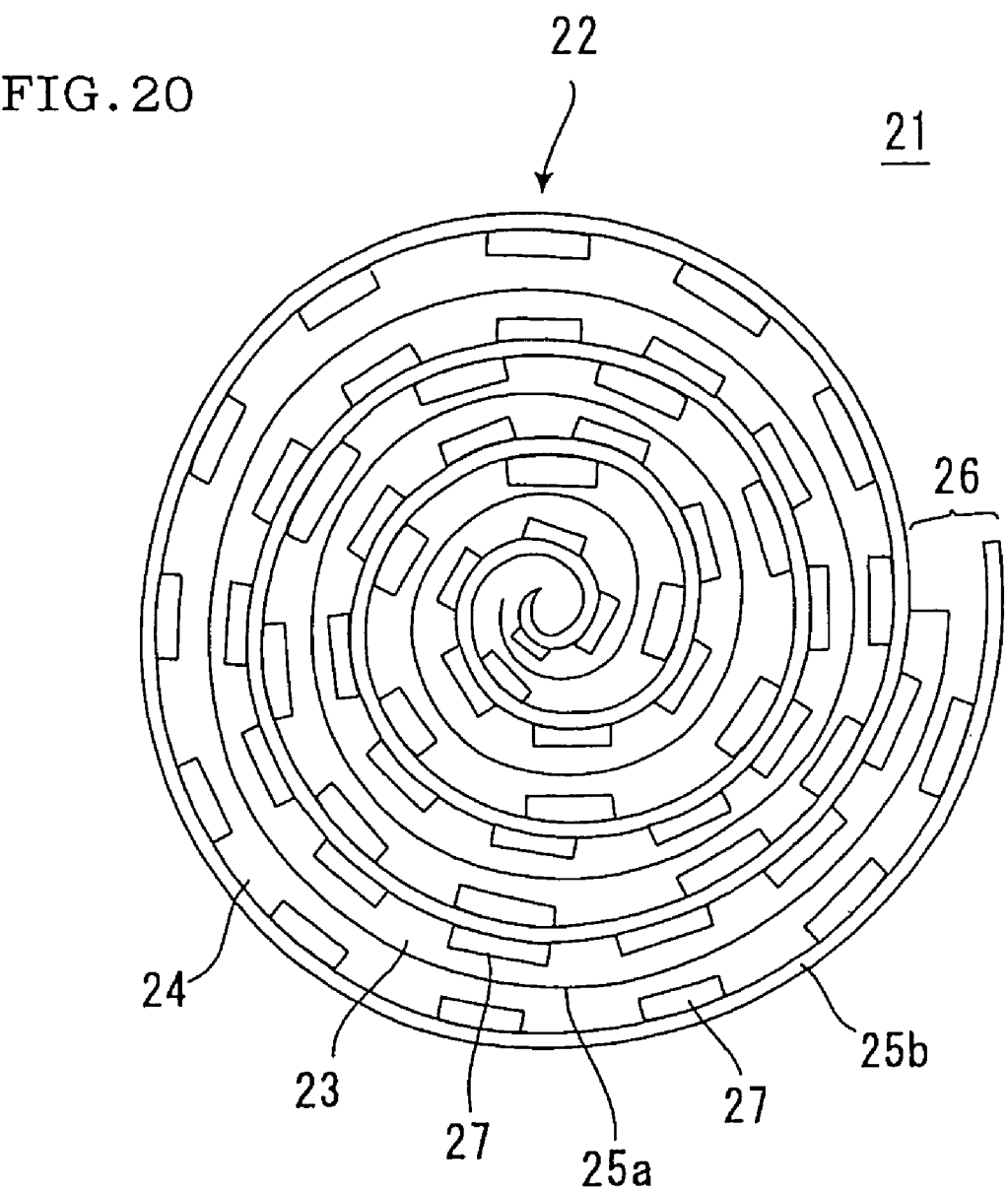
FIG. 20 is a cross-sectional diagram schematically showing yet another embodiment of the plasma reactor according to the invention (second invention).

In FIG. 19, the plasma generating electrode 22 is configured by layering two or more multilayer structures 26 so that the plasma generating space 27 including the layer surface between the multilayer structures 26 is formed therein. As shown in FIG. 20, the plasma generating electrode 22 may be configured by winding one or more of the multilayer structure 26, including two tape-shaped ceramic formed bodies 23 and 24, the electrically continuous film-shaped first conductor electrode 25a held and disposed between the ceramic formed bodies 23 and 24, and the electrically continuous film-shaped or plate-shaped second conductor electrode 25b disposed on two outer surfaces of the ceramic formed bodies 23 and 24 other than the surfaces between which the first conductor electrode 25a is disposed, so that the plasma generating space 27 including wound surfaces or folded surfaces is formed therein. In addition, the plasma generating electrode 22 may be configured by folding.

Such a plasma reactor 21 can generate uniform and stable plasma at low power consumption and can reduce the passage resistance of the gas which passes through the plasma reactor. Since the first conductor electrode 25a is covered with the ceramic formed bodies 23 and 24, oxidation and corrosion of the first conductor electrode 25a can be effectively prevented.

In the plasma reactor 21 according to the embodiment, recesses and protrusions are formed at one of two outer surfaces of the ceramic formed bodies 23 and 24, which make up the multilayer structure 26, other than the surfaces which hold the first conductor electrode 25a.

In the plasma reactor 21 according to the embodiment, one of the first conductor electrode 25a and the second conductor electrode 25b functions as a pulse electrode to which a voltage for generating plasma is applied, and the other functions as a ground electrode connected with ground or the like.

In the embodiment, it is preferable that the first conductor electrode 25a be printed on the ceramic formed bodies 23 and 24. According to this configuration, the first conductor electrode 25a can be easily disposed and the first conductor electrode 25a having a small thickness can be formed, whereby a reduction in the size of the plasma reactor 21 according to the embodiment can be realized. In the embodiment, the second conductor electrode 25b is formed of a flat conductive metal plate.

Figure 76:
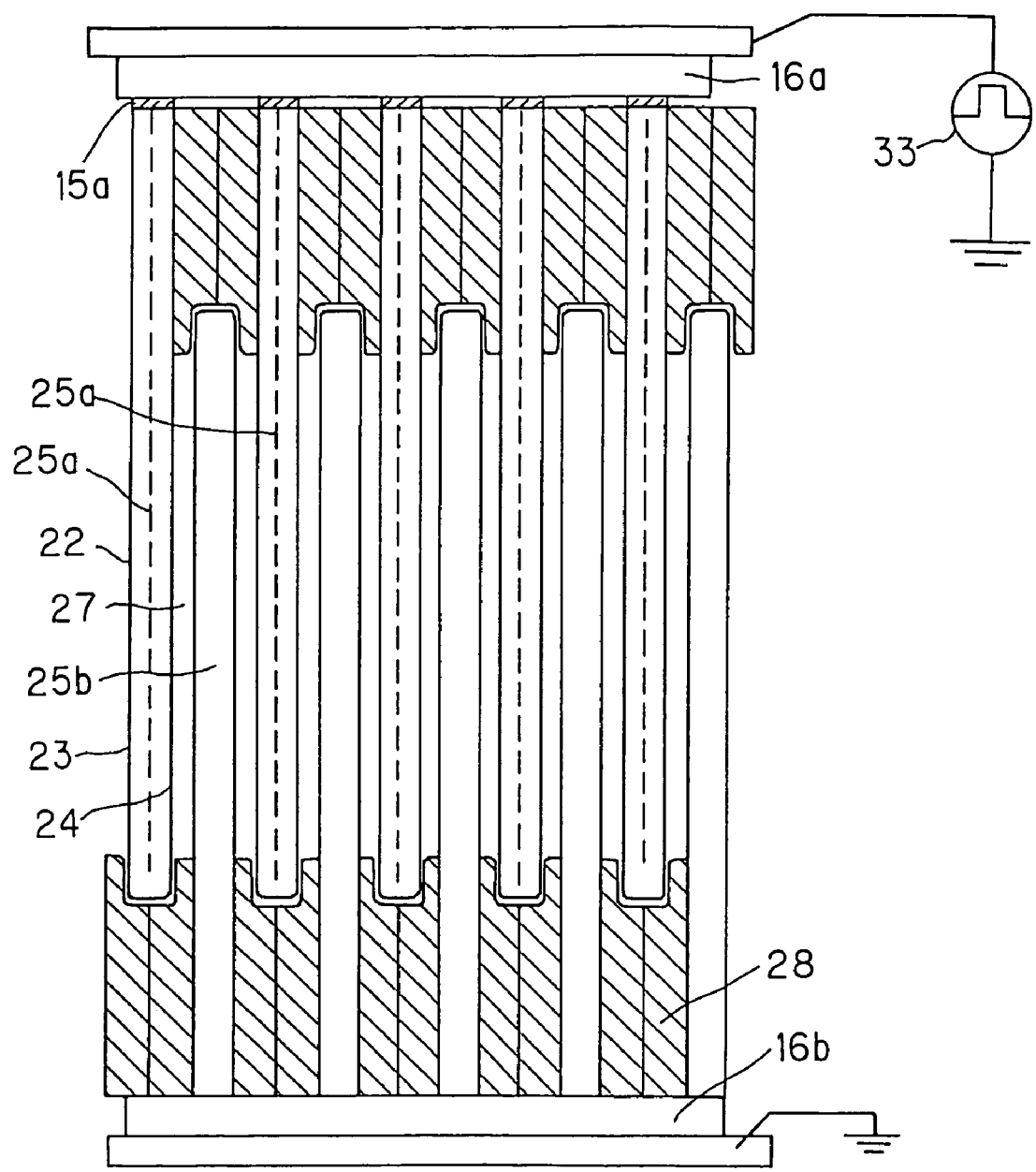
FIG. 76 is a cross-sectional diagram schematically showing another embodiment of the plasma reactor according to the invention (second invention).

In the plasma reactor 21 according to the embodiment, since it suffices that the multilayer structures 26 be layered so that the plasma generating space 27 including the layer surface is formed therein, a gap member 28 having a predetermined thickness may be disposed between the plasma generating electrode 22 and the second conductor electrode 25b, as shown in FIG. 76, without forming recesses and protrusions at one of two outer surfaces of the ceramic formed bodies 23 and 24 other than the surfaces which hold the first conductor electrode 25a. The gap formed by the gap members 28 functions as the plasma generating space 27. When connecting the plasma reactor 21 with the power supply 33 as shown in FIG. 76, it is preferable to dispose the connection terminal 15a which is electrically connected with the first conductor electrode 25a at one end of each plasma generating electrode 22 in which the first conductor electrode 25a is disposed, dispose the current collector member 16a for simultaneously applying current to each connection terminal 15a, and electrically connect the current collector member 16a with the power supply 33. In this case, it is preferable to dispose the current collector member 16b for simultaneously applying current to each second conductor electrode 25b at the other end of the second conductor electrode 25b and connects the current collector member 16b with ground. The second conductor electrode 25b may be connected with the power supply 33, and the first conductor electrode 25a may be connected with ground, for example. In FIG. 76, elements configured in the same manner as the elements shown in FIG. 19 are indicated by the same symbols, and description of these elements is omitted.

The plasma reactor 21 according to the embodiment may be installed and used in a combustion gas exhaust system upstream of a filter for trapping particulate matter such as soot contained in exhaust gas, for example. In more detail, the plasma reactor may be used to oxidize nitrogen monoxide contained in exhaust gas to produce nitrogen dioxide required for filter regeneration. The plasma reactor 21 may also be suitably used as an ozonizer which produces ozone by reacting oxygen contained in air or the like. The plasma reactor 21 may be installed upstream of an exhaust gas catalytic converter, and may be used to convert NO into $NO_2$ and produce reactive species (ozone and OH) or the like to significantly improve the purification efficiency (e.g. for HC, CO, and $NO_x$) of the downstream converter. In the application in which the electrode surface of the plasma reactor 21 is coated with a catalyst, the plasma reactor 21 can also function as the catalytic converter.

As the ceramic formed bodies 23 and 24 used in the embodiment, ceramic formed bodies configured in the same manner as the ceramic formed bodies 3 and 4 (see FIG. 1) described in the embodiment of the plasma reactor of the first invention may be suitably used.

As the material for the first conductor electrode 25a, a highly conductive metal is preferably used. For example, a metal containing at least one component selected from the group consisting of tungsten, silver, platinum, gold, iron, copper, and cermet can be given as a preferable example.

The thickness of the first conductor electrode 25a in the embodiment is preferably 0.01 to 0.1 mm, and still more preferably 0.01 to 0.015 mm in order to reduce the size of the plasma generating electrode 22 and reduce the passage resistance of the gas, for example. When forming the first conductor electrode 25a by printing, it is preferable to form the first conductor electrode 25a by screen printing.

As the material for the second conductor electrode 25b, a highly conductive metal is preferably used. For example, a metal containing at least one component selected from the group consisting of tungsten, silver, platinum, gold, iron, copper, and cermet can be given as a preferable example.

The thickness of the second conductor electrode 25b in the embodiment is preferably 0.01 to 0.1 mm, and still more preferably 0.01 to 0.015 mm in order to reduce the size of the plasma generating electrode 22 and reduce the passage resistance of a gas, for example.

The shape of the first and second conductor electrodes 25a and 25b is not particularly limited insofar as electricity can be discharged between the adjacent first and second conductor electrodes 25a and 25b to effectively generate plasma in the plasma generating space 27. For example, the first and second conductor electrodes 25a and 25b may be formed to cover the entire surface of one of the ceramic formed bodies 23 and 24, or may be formed in the shape of a mesh, or may have a shape in which openings in the shape of a polygon, circle, or ellipse are disposed in a lattice arrangement or a staggered arrangement in the same manner as the conductor electrode 5 shown in FIGS. 3 to 6.

In the embodiment, it is preferable that the relationship between a thickness t of the thin section of the plasma generating electrode 22 and a height h of the protrusion formed on the surface of the multilayer structure 26 which makes up the plasma generating electrode 22 satisfy the following equation (4).

$$0.7t < h \quad (4)$$

This configuration makes it possible to cause a gas which passes through the plasma generating space 27 to react with high efficiency. Moreover, since the plasma generating electrode 22 exhibits excellent mechanical strength, the plasma reactor 21 can be installed in an automotive exhaust system or the like to which impact is always applied. If the relationship between the thickness t of the thin section of the plasma generating electrode 22 and the height h of the protrusion formed on the surface of the multilayer structure 26 which makes up the plasma generating electrode 22 does not satisfy the equation (4), the structural strength may be significantly decreased.

In the embodiment, it is preferable that the thickness t of the thin section of the plasma generating electrode 22 be 0.2 to 6 mm. This configuration enables a plasma field exhibiting excellent reactivity to be generated and reduces the passage resistance of the gas. If the thickness t of the thin section of the plasma generating electrode 22 is less than 0.2 mm, the structural strength may be decreased. If the thickness t exceeds 6 mm, since the rigidity of the structure becomes too high, the thermal shock resistance may be decreased.

In the plasma reactor 21 according to the embodiment, it is preferable that the plasma generating electrode be placed in a conductive casing with a buffer material having conductivity and elasticity interposed therebetween (not shown). As the casing used in the embodiment, a casing configured in the same manner as the casing 30 shown in FIG. 14 may be suitably used. The plasma reactor according to the embodiment may further include a power supply for applying a voltage to the first or second conductor electrode. As the power supply, the power supply 13 of the plasma reactor 1 shown in FIG. 7 may be suitably used.

The plasma generating electrode 22 according to the embodiment is not limited to the plasma generating electrode which is wound so that the cross-sectional shape is a spiral as shown in FIG. 20. The plasma generating electrode 22 which is wound so that at least a part of the cross-sectional shape is linear as shown in FIG. 15, the plasma generating electrode 22 which is wound so that the cross section is in the shape of the figure "8" as shown in FIG. 16, the plasma generating electrode 22 in which one or more multilayer structures are folded as shown in FIG. 17, and the plasma generating electrode 22 in which one or more multilayer structures are folded and wound in a predetermined shape as shown in FIG. 18 may also be used.

Figure 21:
FIG. 21 is an explanatory diagram showing a step of forming a ceramic formed body in a method of manufacturing a plasma reactor according to the invention (third invention).
Figure 21:
Figure 23:
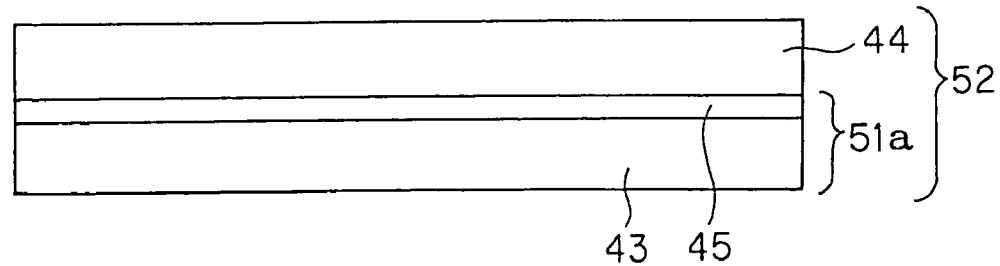
FIG. 23 is an explanatory diagram showing a step of forming a ceramic formed body in the method of manufacturing a plasma reactor according to the invention (third invention).
Figure 24:
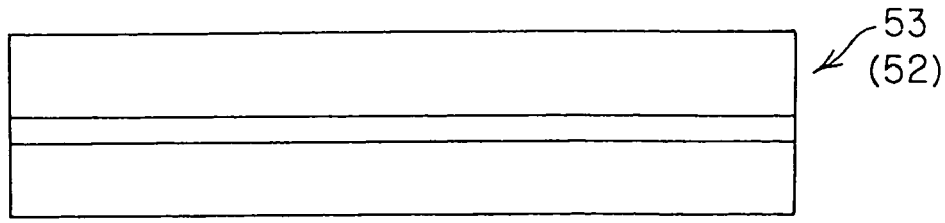
FIG. 24 is an explanatory diagram showing a firing step in the method of manufacturing a plasma reactor according to the invention (third invention).

A method of manufacturing a plasma reactor according to the invention (third invention) is described below. A method of manufacturing a plasma reactor according to the embodiment is a method of manufacturing a plasma reactor which includes a plasma generating electrode capable of generating plasma upon application of a voltage and can cause a gas to react by the plasma generated, the method comprising: forming tape-shaped first and second unfired ceramic formed bodies 43 and 44 by tape-forming, as shown in FIG. 21; printing a conductor electrode 45 on one surface of the resulting first unfired ceramic formed body 43 to form an unfired ceramic formed body 51a having an electrode, as shown in FIG. 22; layering the resulting unfired ceramic formed body 51a having an electrode and the second unfired ceramic formed body 44 so as to cover the conductor electrode 45 of the unfired ceramic formed body 51a having an electrode to form an unfired multilayer structure 52, as shown in FIG. 23; firing the resulting unfired multilayer structure 52 to form a multilayer structure 53, as shown in FIG. 24; and layering two or more of the resulting multilayer structures 53 to form the plasma generating electrode.

Each step is described below in more detail. As shown in FIG. 21, at least one material selected from the group consisting of cordierite, mullite, alumina, silicon nitride, SIALON, and zirconia is mixed using a trommel to prepare a slurry used as the raw material for the first and second unfired ceramic formed bodies 43 and 44. At least one material selected from the group consisting of an organic solvent such as toluene or butadiene, a binder such as a butyral resin or a cellulose resin, and a plasticizer such as DOP or DBP may be further added to the slurry.

The raw material thus prepared is subjected to bubble removal by stirring under reduced pressure, viscosity adjustment, and tape-forming such as a doctor blade method or the like to form the tape-shaped first and second unfired ceramic formed bodies 43 and 44. There are no specific limitations to the size of the first and second unfired ceramic formed bodies 43 and 44. For example, it is preferable that the length in the longitudinal direction be 10 to 60,000 mm, the width be 10 to 300 mm, and the thickness be 0.2 to 4 mm.

Figure 22:
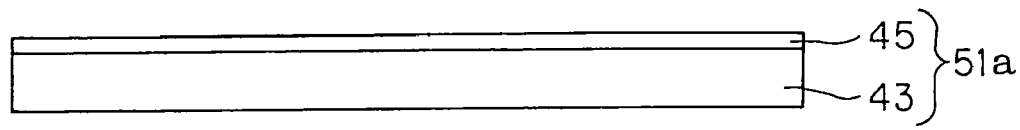
FIG. 22 is an explanatory diagram showing a step of forming a conductor electrode in the method of manufacturing a plasma reactor according to the invention (third invention).

As shown in FIG. 22, the conductor electrode 45 is disposed by printing (e.g. screen-printing) a metal containing at least one component selected from the group consisting of tungsten, silver, platinum, gold, iron, copper, and cermet, which is prepared as a paste, on one surface of the resulting first unfired ceramic formed body 43 to form the unfired ceramic formed body 51a having an electrode. It is preferable that the shape of the conductor electrode 45 be similar to the shape of the conductor electrode 5 used in the plasma reactor 1 shown in FIG. 1.

As shown in FIG. 23, the resulting unfired ceramic formed body 51a having an electrode and the second unfired ceramic formed body 44 are layered so as to cover the conductor electrode 45 of the unfired ceramic formed body 51a having an electrode to form the unfired multilayer structure 52. In this case, it is preferable to press the unfired ceramic formed body 51a having an electrode and the second unfired ceramic formed body 44 using a winder or the like.

As shown in FIG. 24, the resulting unfired multilayer structure 52 is placed in an electric furnace or the like, and fired at 1000 to 1500° C. for 1 to 5 hours (temperature and time may vary depending on the size of the unfired multilayer structure 52 or the like) to form the multilayer structure 53.

Then, two or more of the resulting multilayer structures 53 are layered so that a plasma generating space including the layer surface between the multilayer structures 53 is formed therein and plasma can be generated in the plasma generating space by discharging electricity between the adjacent conductor electrodes 45.

This configuration enables a plasma reactor which can generate uniform and stable plasma at low power consumption to be easily manufactured at low cost.

One embodiment of a method of manufacturing a plasma reactor according to the invention (fourth invention) is described below. A method of manufacturing a plasma reactor according to the embodiment is a method of manufacturing a plasma reactor which includes a plasma generating electrode capable of generating plasma upon application of a voltage and can cause a gas to react by the plasma generated, the method comprising: forming the tape-shaped first and second unfired ceramic formed bodies 43 and 44 by tape-forming, as shown in FIG. 25; printing the conductor electrode 45 on one surface of the resulting first unfired ceramic formed body 43 to form the unfired ceramic formed body 51a having an electrode, as shown in FIG. 26; layering the resulting unfired ceramic formed body 51a having an electrode and the second unfired ceramic formed body 44 so as to cover the conductor electrode 45 of the unfired ceramic formed body 51a having an electrode to form the unfired multilayer structure 52, as shown in FIG. 27; winding or folding two or more (even number) of the resulting unfired multilayer structures 52 to form a wound unfired multilayer structure 54, as shown in FIG. 28; and firing the resulting wound unfired multilayer structure 54 to form the plasma generating electrode.

Each step is described below in more detail. Since the steps shown in FIGS. 25 to 27 are carried out in the same manner as the steps shown in FIGS. 21 to 23, description of these steps is omitted.

Figure 25:
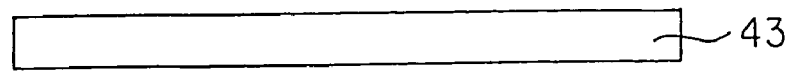
FIG. 25 is an explanatory diagram showing a step of forming a ceramic formed body in a method of manufacturing a plasma reactor according to the invention (fourth invention).
Figure 25:
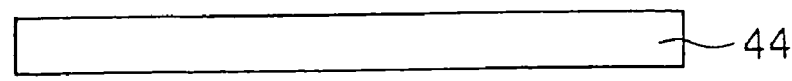
Figure 26:
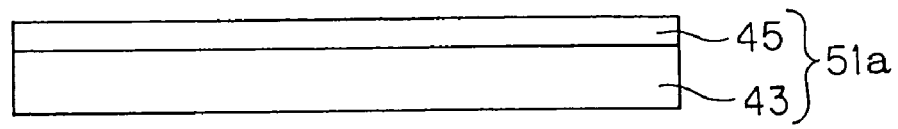
FIG. 26 is an explanatory diagram showing a step of forming a conductor electrode in the method of manufacturing a plasma reactor according to the invention (fourth invention).
Figure 27:
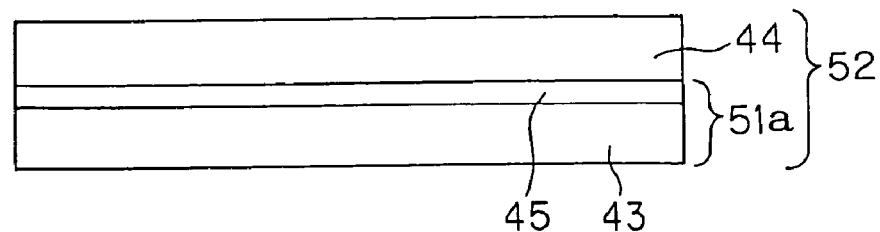
FIG. 27 is an explanatory diagram showing a step of forming a ceramic formed body in the method of manufacturing a plasma reactor according to the invention (fourth invention).
Figure 28:
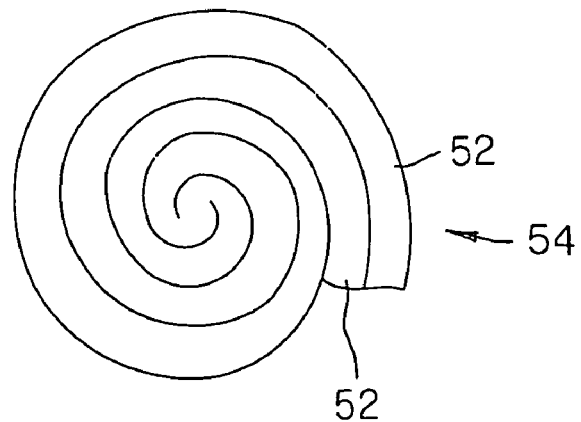
FIG. 28 is an explanatory diagram showing a step of forming a plasma generating electrode in the method of manufacturing a plasma reactor according to the invention (fourth invention).

In the method of manufacturing a plasma reactor according to the embodiment, after obtaining the unfired multilayer structure 52 according to the steps shown in FIGS. 25 to 27, two or more (even number) of the resulting unfired multilayer structures 52 are wound so that the cross-sectional shape is a spiral to form the wound unfired multilayer structure 54, so that a plasma generating space including the layer surface between multilayer structures 52 is formed therein and plasma can be generated in the plasma generating space by discharging electricity between the adjacent conductor electrodes 45, as shown in FIG. 28. The cross-sectional shape when winding the unfired multilayer structures 52 is not limited to a spiral.

The wound unfired multilayer structure 54 is placed in an electric furnace or the like, and fired at 1000 to 1500° C. for 1 to 5 hours (temperature and time may vary depending on the size of the wound unfired multilayer structure 54 or the like) to form the plasma generating electrode.

This configuration enables a plasma reactor which can generate uniform and stable plasma at low power consumption to be easily manufactured at low cost.

Figure 31:
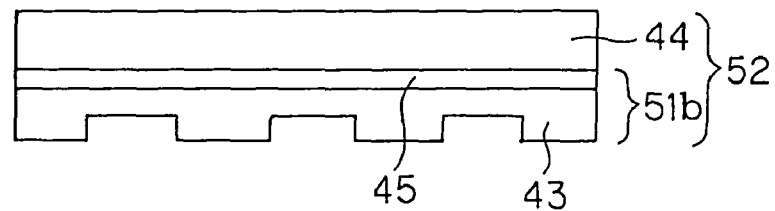
FIG. 31 is an explanatory diagram showing a step of forming a ceramic formed body in the method of manufacturing a plasma reactor according to the invention (fifth invention).
Figure 32:
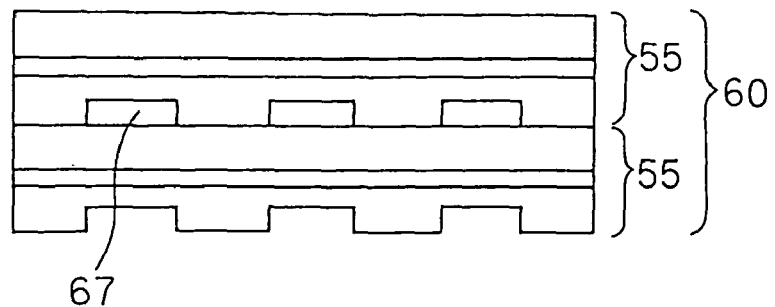
FIG. 32 is an explanatory diagram showing a step of forming a plasma generating electrode in the method of manufacturing a plasma reactor according to the invention (fifth invention).

One embodiment of a method of manufacturing a plasma reactor according to the invention (fifth invention) is described below. A method of manufacturing a plasma reactor according to the embodiment is a method of manufacturing a plasma reactor which includes a plasma generating electrode capable of generating plasma upon application of a voltage and can cause a gas to react by the plasma generated, the method comprising: forming the tape-shaped first and second unfired ceramic formed bodies 43 and 44 by tape-forming, as shown in FIG. 29; printing the conductor electrode 45 on one surface of the resulting first unfired ceramic formed body 43 and forming recesses and protrusions at the other surface to form an unfired ceramic formed body 51b having an electrode, as shown in FIG. 30; layering the resulting unfired ceramic formed body 51b having an electrode and the second unfired ceramic formed body 44 so as to cover the conductor electrode 45 of the unfired ceramic formed body 51b having an electrode to form the unfired multilayer structure 52, as shown in FIG. 31; firing the resulting unfired multilayer structure 52 to form a multilayer structure 55, as shown in FIG. 32; and layering two or more of the resulting multilayer structures 55 to form a plasma generating electrode 60.

Each step is described below in more detail. Since the steps shown in FIGS. 29 and 31 are carried out in the same manner as the steps shown in FIGS. 21 and 23, description of these steps is partly omitted.

Figure 29:
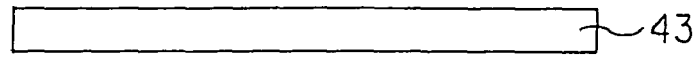
FIG. 29 is an explanatory diagram showing a step of forming a ceramic formed body in a method of manufacturing a plasma reactor according to the invention (fifth invention).
Figure 29:
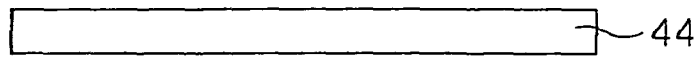
Figure 30:
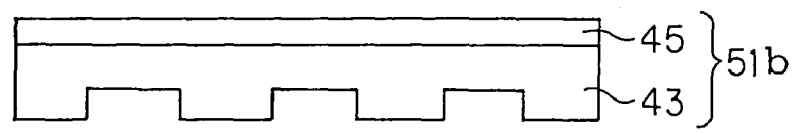
FIG. 30 is an explanatory diagram showing a step of forming a conductor electrode in the method of manufacturing a plasma reactor according to the invention (fifth invention).

After forming the first and second unfired ceramic formed bodies 43 and 44 as shown in FIG. 29, the conductor electrode 45 is printed on one surface of the resulting first unfired ceramic formed body 43 by screen-printing a metal containing at least one component selected from the group consisting of tungsten, silver, platinum, gold, iron, copper, and cermet, which is prepared as a paste, as shown in FIG. 30.

Figure 33:
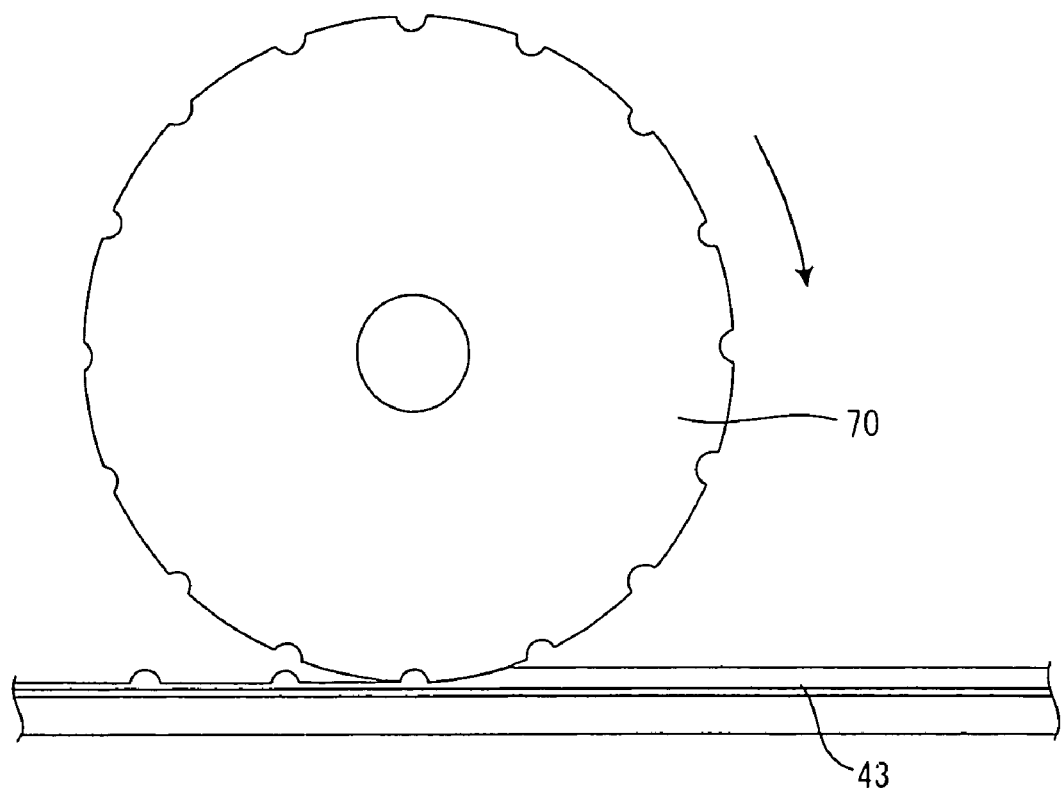
FIG. 33 is an explanatory diagram showing one embodiment of a step of forming recesses and protrusions at the ceramic formed body in the method of manufacturing a plasma reactor according to the invention (fifth invention).
Figure 34A:
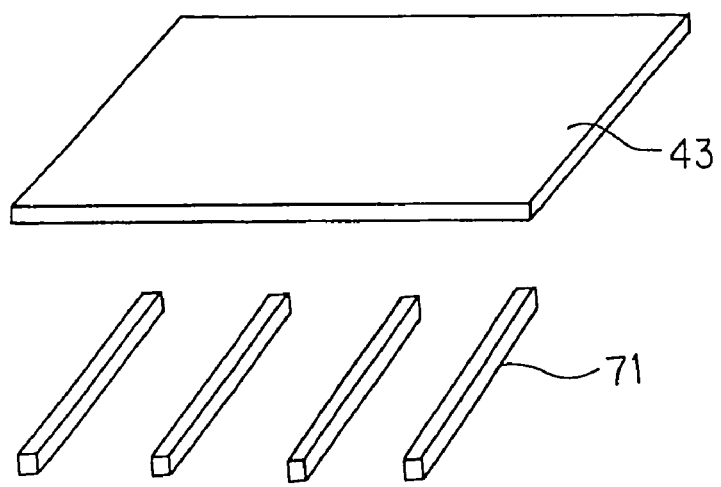
FIGS. 34(a) and 34(b) are explanatory diagrams showing another embodiment of the step of forming recesses and protrusions at the ceramic formed body in the method of manufacturing a plasma reactor according to the invention (fifth invention) in the order of steps.
Figure 34B:
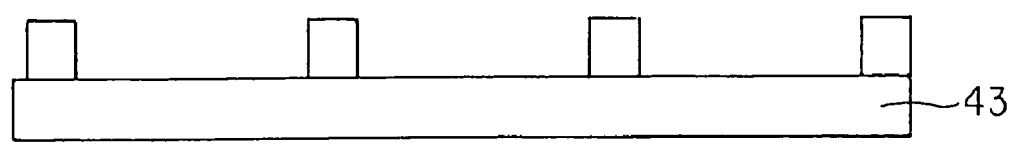

As shown in FIG. 33, recesses and protrusions are formed at the surface of the first unfired ceramic formed body 43 by rotating a gear wheel 70 in the shape of the recesses and protrusions while pressing the gear wheel 70. As shown in FIG. 34(*a*), rod-shaped unfired ceramic members 71 may be caused to adhere to the first unfired ceramic formed body 43 at predetermined intervals to form the first unfired ceramic formed body 43 having recesses and protrusions as shown in FIG. 34(*b*). The order of the formation of the recesses and protrusions and the formation of the conductor electrode 45 shown in FIG. 30 may be reversed.

The unfired multilayer structure 52 is formed by a step almost similar to the step shown in FIG. 23.

The resulting unfired multilayer structure 52 is placed in an electric furnace or the like, and fired at 1000 to 1500° C. for 1 to 5 hours (temperature and time may vary depending on the size of the unfired multilayer structure 52 or the like) to form the multilayer structure 55 as shown in FIG. 32.

Then, two or more of the resulting multilayer structures 55 are layered so that a plasma generating space 67 including the layer surface between the multilayer structures 55 is formed therein and plasma can be generated in the plasma generating space by discharging electricity between the adjacent conductor electrodes 45 to form the plasma generating electrode 60.

In the embodiment, it is preferable that the recesses and protrusions formed in FIG. 30 be configured so that the relationship between a thickness t of the thin section of the plasma generating electrode 60 (see FIG. 32) and a height h of the protrusion formed on the surface of the multilayer structure 55 (see FIG. 32) which makes up the plasma generating electrode 60 (see FIG. 32) satisfy the following equation (5). It is preferable that the plasma generating electrode 60 be manufactured so that the thickness t of the thin section of the plasma generating electrode 60 (see FIG. 32) is 0.2 to 6 mm.

$$0.7t < h \tag{5}$$

This configuration enables a plasma reactor which can generate uniform and stable plasma at low power consumption to be easily manufactured at low cost.

One embodiment of a method of manufacturing a plasma reactor according to the invention (sixth invention) is described below. A method of manufacturing a plasma reactor according to the embodiment is a method of manufacturing a plasma reactor which includes a plasma generating electrode capable of generating plasma upon application of a voltage and can cause a gas to react by the plasma generated, the method comprising: forming the tape-shaped first and second unfired ceramic formed bodies 43 and 44 by tape-forming, as shown in FIG. 35; printing the conductor electrode 45 on one surface of the resulting first unfired ceramic formed body 43 and forming recesses and protrusions at the other surface to form the unfired ceramic formed body 51*b* having an electrode, as shown in FIG. 36; layering the resulting unfired ceramic formed body 51*b* having an electrode and the second unfired ceramic formed body 44 so as to cover the conductor electrode 45 of the unfired ceramic formed body 51*b* having an electrode to form the unfired multilayer structure 52, as shown in FIG. 37; winding or folding two or more (even number) of the resulting unfired multilayer structures 52 to form a wound unfired multilayer structure 56, as shown in FIG. 38; and firing the resulting wound unfired multilayer structure 56 to form the plasma generating electrode 60.

Each step is described below in more detail. Since the steps shown in FIGS. 35 to 37 are carried out in the same manner as the steps shown in FIGS. 29 to 31, description of these steps is partly omitted.

Figure 35:
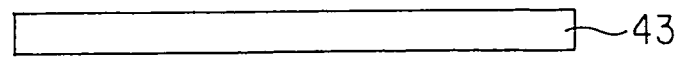
FIG. 35 is an explanatory diagram showing a step of forming a ceramic formed body in a method of manufacturing a plasma reactor according to the invention (sixth invention).
Figure 36:
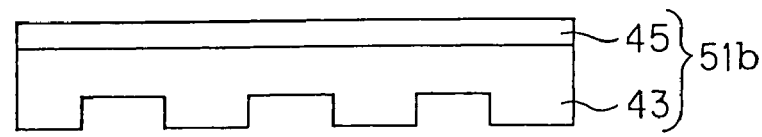
FIG. 36 is an explanatory diagram showing a step of forming a conductor electrode in the method of manufacturing a plasma reactor according to the invention (sixth invention).
Figure 37:
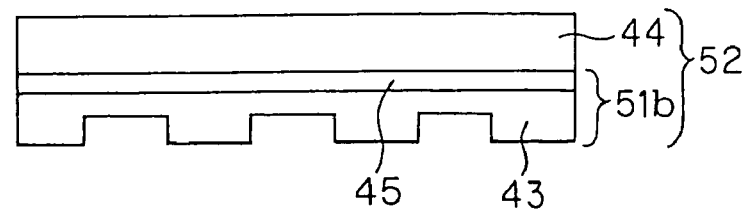
FIG. 37 is an explanatory diagram showing a step of layering a ceramic formed body in the method of manufacturing a plasma reactor according to the invention (sixth invention).
Figure 38:
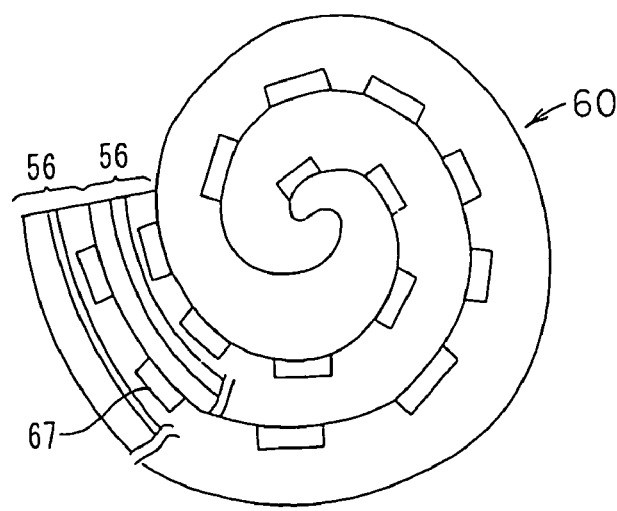
FIG. 38 is an explanatory diagram showing a step of forming a plasma generating electrode in the method of manufacturing a plasma reactor according to the invention (sixth invention).

After obtaining the unfired multilayer structure 52 according to the steps shown in FIGS. 35 to 37, two or more (even number) of the resulting unfired multilayer structures 52 (see FIG. 37) are wound so that the cross-sectional shape is spiral, so that the plasma generating space 67 including the layer surface is formed therein and plasma can be generated in the plasma generating space 67 by discharging electricity between the adjacent conductor electrodes 45, to form the wound unfired multilayer structure 56, as shown in FIG. 38, for example. The cross-sectional shape when winding the unfired multilayer structures 52 is not limited to the shape shown in FIG. 38.

The resulting wound unfired multilayer structure 56 is placed in an electric furnace or the like, and fired at 1000 to 1500° C. for 1 to 5 hours (temperature and time may vary depending on the size of the wound unfired multilayer structure 56 or the like) to form the plasma generating electrode 60.

This configuration enables a plasma reactor which can generate uniform and stable plasma at low power consumption to be easily manufactured at low cost.

Figure 39:
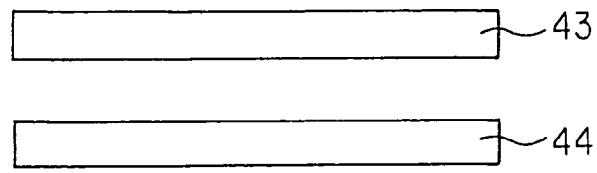
FIG. 39 is an explanatory diagram showing a step of forming a ceramic formed body in a method of manufacturing a plasma reactor according to the invention (seventh invention).
Figure 40:
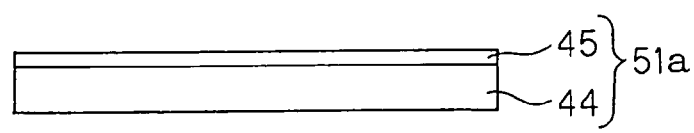
FIG. 40 is an explanatory diagram showing a step of forming a conductor electrode in the method of manufacturing a plasma reactor according to the invention (seventh invention).
Figure 41:
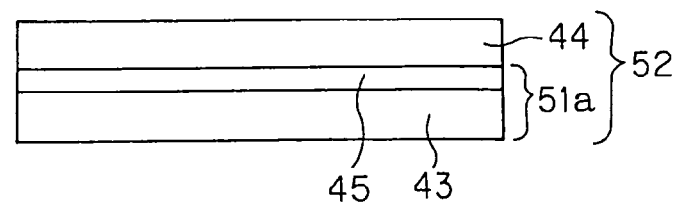
FIG. 41 is an explanatory diagram showing a step of layering a ceramic formed body in the method of manufacturing a plasma reactor according to the invention (seventh invention).
Figure 42:
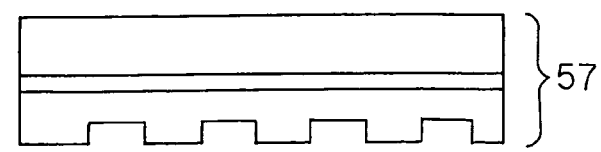
FIG. 42 is an explanatory diagram showing a step of forming recesses and protrusions at the ceramic formed body in a method of manufacturing a plasma reactor according to the invention (seventh invention).
Figure 43:
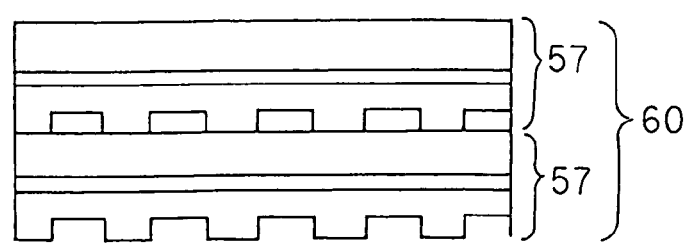
FIG. 43 is an explanatory diagram showing a step of forming a plasma generating electrode in the method of manufacturing a plasma reactor according to the invention (seventh invention).

One embodiment of a method of manufacturing a plasma reactor according to the invention (seventh invention) is described below. A method of manufacturing a plasma reactor according to the embodiment is a method of manufacturing a plasma reactor which includes a plasma generating electrode capable of generating plasma upon application of a voltage and can cause a gas to react by the plasma generated, the method comprising: forming the tape-shaped first and second unfired ceramic formed bodies 43 and 44 by tape-forming, as shown in FIG. 39; printing the conductor electrode 49 on one surface of the resulting first unfired ceramic formed body 43 to form the unfired ceramic formed body 51*a* having an electrode, as shown in FIG. 40; layering the resulting unfired ceramic formed body 51*a* having an electrode and the second unfired ceramic formed body 44 so as to cover the conductor electrode 45 of the unfired ceramic formed body 51*a* having an electrode to form the unfired multilayer structure 52, as shown in FIG. 41; forming recesses and protrusions at one surface of the resulting unfired multilayer structure 52 (see FIG. 41) to form an unfired multilayer structure 57 having recesses and protrusions, as shown in FIG. 42; firing the resulting unfired multilayer structure 57 having recesses and protrusions to form a multilayer structure, as shown in FIG. 43; and layering two or more of the resulting multilayer structures to form the plasma generating electrode 60.

This configuration enables a plasma reactor which can generate uniform and stable plasma at low power consumption to be easily manufactured at low cost.

Figure 44:
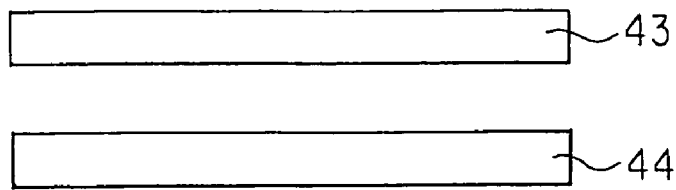
FIG. 44 is an explanatory diagram showing a step of forming a ceramic formed body in a method of manufacturing a plasma reactor according to the invention (eighth invention).
Figure 45:
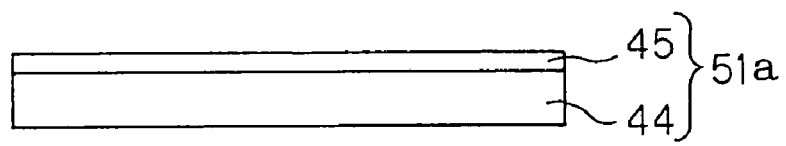
FIG. 45 is an explanatory diagram showing a step of forming a conductor electrode in the method of manufacturing a plasma reactor according to the invention (eighth invention).
Figure 46:
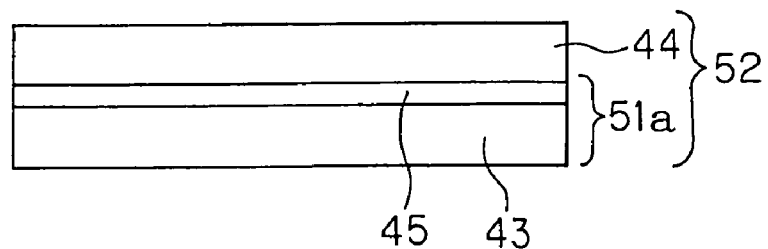
FIG. 46 is an explanatory diagram showing a step of layering a ceramic formed body in the method of manufacturing a plasma reactor according to the invention (eighth invention).
Figure 47:
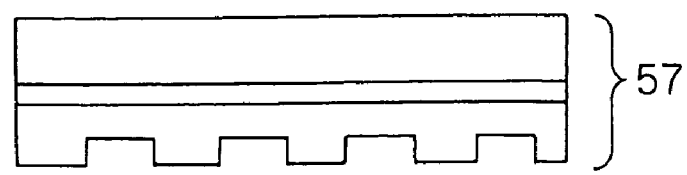
FIG. 47 is an explanatory diagram showing a step of forming recesses and protrusions at the ceramic formed body in a method of manufacturing a plasma reactor according to the invention (eighth invention).

One embodiment of a method of manufacturing a plasma reactor according to the invention (eighth invention) is described below. A method of manufacturing a plasma reactor according to the embodiment is a method of manufacturing a plasma reactor which includes a plasma generating electrode capable of generating plasma upon application of a voltage and can cause a gas to react by the plasma generated, the method comprising: forming the tape-shaped first and second unfired ceramic formed bodies 43 and 44 by tape-forming, as shown in FIG. 44; printing the conductor electrode 45 on one surface of the resulting first unfired ceramic formed body 44 to form the unfired ceramic formed body 51*a* having an electrode, as shown in FIG. 45; layering the resulting unfired ceramic formed body 51a having an electrode and the second unfired ceramic formed body 44 so as to cover the conductor electrode 45 of the unfired ceramic formed body 51*a* having an electrode to form the unfired multilayer structure 52, as shown in FIG. 46; forming recesses and protrusions at one surface of the resulting unfired multilayer structure 47 to form the unfired multilayer structure 57 having recesses and protrusions, as shown in FIG. 47; winding or folding two or more (even number) of the unfired multilayer structures 57 having recesses and protrusions (see FIG. 47) in the same manner as in the step shown in FIG. 38 to form the wound unfired multilayer structure 56; and firing the resulting wound unfired multilayer structure 56 to form the plasma generating electrode 60.

This configuration enables a plasma reactor which can generate uniform and stable plasma at low power consumption to be easily manufactured at low cost.

Figure 48:
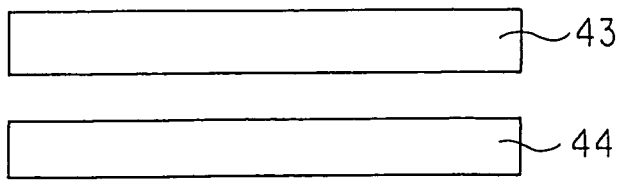
FIG. 48 is an explanatory diagram showing a step of forming a ceramic formed body in a method of manufacturing a plasma reactor according to the invention (ninth invention).
Figure 49:
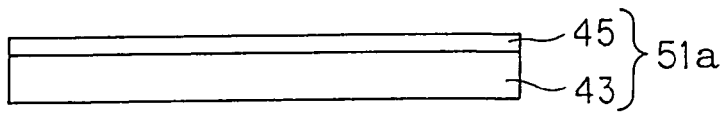
FIG. 49 is an explanatory diagram showing a step of forming a first conductor electrode in the method of manufacturing a plasma reactor according to the invention (ninth invention).
Figure 53:
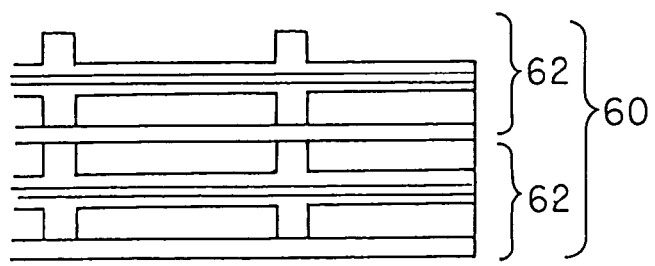
FIG. 53 is an explanatory diagram showing a step of forming a plasma generating electrode in the method of manufacturing a plasma reactor according to the invention (ninth invention).

One embodiment of a method of manufacturing a plasma reactor according to the invention (ninth invention) is described below. A method of manufacturing a plasma reactor according to the embodiment is a method of manufacturing a plasma reactor which includes a plasma generating electrode capable of generating plasma upon application of a voltage and can cause a gas to react by the plasma generated, the method comprising: forming the tape-shaped first and second unfired ceramic formed bodies 43 and 44 by tape-forming, as shown in FIG. 48; printing the conductor electrode 45 on one surface of the resulting first unfired ceramic formed body 43 to form the unfired ceramic formed body 51a having an electrode, as shown in FIG. 49; layering the resulting unfired ceramic formed body 51a having an electrode and the second unfired ceramic formed body 44 so as to cover the conductor electrode 45 of the unfired ceramic formed body 51a having an electrode to form the unfired multilayer structure 52, as shown in FIG. 50; forming recesses and protrusions at each surface of the resulting unfired multilayer structure 52 (see FIG. 50) to form an unfired multilayer structure 58 having recesses and protrusions, as shown in FIG. 51; disposing a plate-shaped second conductor electrode 61 on one surface of the resulting unfired multilayer structure 58 having recesses and protrusions (see FIG. 51) to form an unfired multilayer structure 59 having an electrode; firing the unfired multilayer structure 59 having an electrode to form a multilayer structure 62 having an electrode, as shown in FIG. 53; and layering two or more of the resulting multilayer structures having an electrode to form the plasma generating electrode 60.

This configuration enables a plasma reactor which can generate uniform and stable plasma at low power consumption to be easily manufactured at low cost.

Figure 50:
FIG. 50 is an explanatory diagram showing a step of layering a ceramic formed body in the method of manufacturing a plasma reactor according to the invention (ninth invention).
Figure 51:
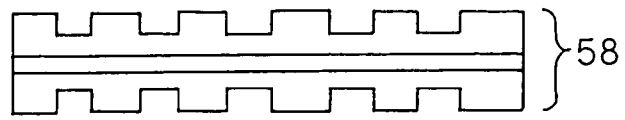
FIG. 51 is an explanatory diagram showing a step of forming recesses and protrusions at the ceramic formed body in a method of manufacturing a plasma reactor according to the invention (ninth invention).
Figure 52:
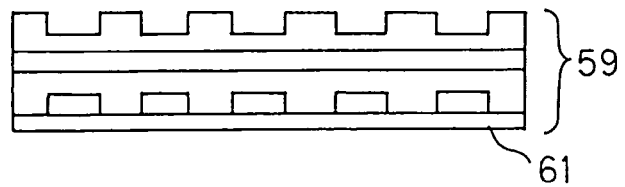
FIG. 52 is an explanatory diagram showing a step of forming a second conductor electrode in the method of manufacturing a plasma reactor according to the invention (ninth invention).
Figure 54:
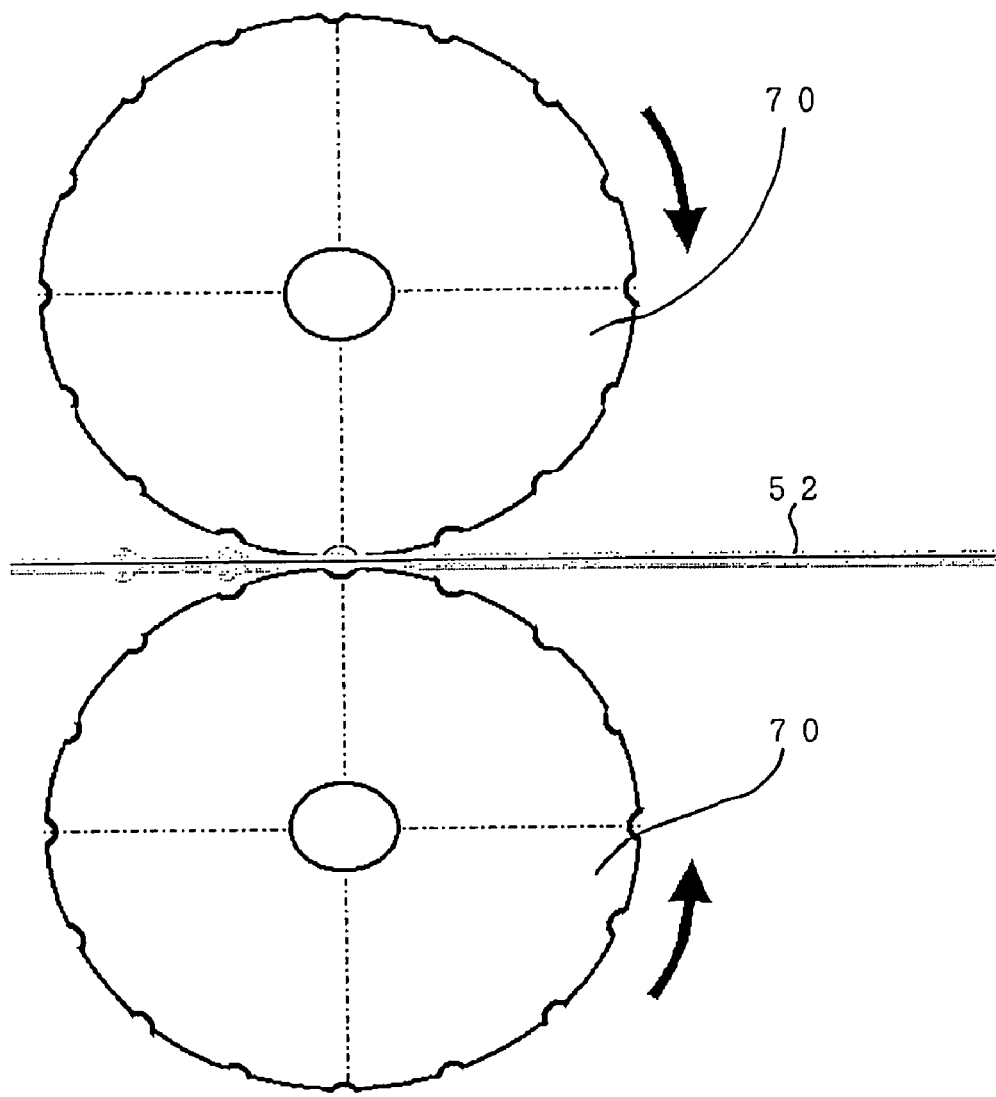
FIG. 54 is an explanatory diagram showing one embodiment of a step of forming recesses and protrusions at the ceramic formed body in the method of manufacturing a plasma reactor according to the invention (ninth invention).

As the method for forming recesses and protrusions at each surface of the unfired multilayer structure 52 shown in FIGS. 50 and 51, a method of forming the unfired multilayer structure 52 using the gear wheels (winders) 70 on which recesses and protrusions are formed at the surface, as shown in FIG. 54, may be suitably used.

Figure 55:
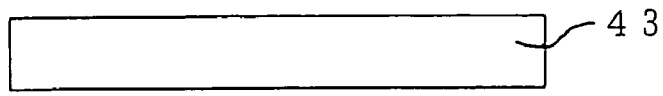
FIG. 55 is an explanatory diagram showing a step of forming a ceramic formed body in a method of manufacturing a plasma reactor according to the invention (tenth invention).
Figure 55:
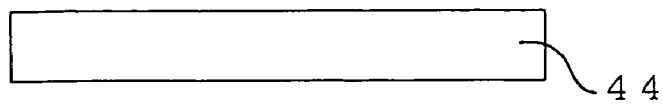
Figure 56:
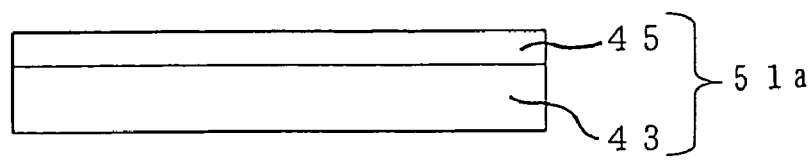
FIG. 56 is an explanatory diagram showing a step of forming a first conductor electrode in the method of manufacturing a plasma reactor according to the invention (tenth invention).
Figure 57:
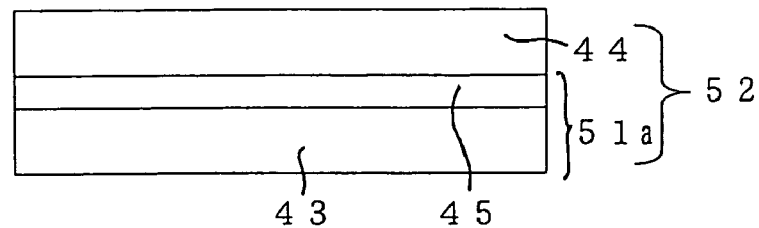
FIG. 57 is an explanatory diagram showing a step of layering a ceramic formed body in the method of manufacturing a plasma reactor according to the invention (tenth invention).
Figure 58:
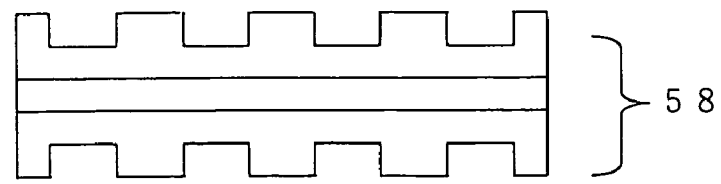
FIG. 58 is an explanatory diagram showing a step of forming recesses and protrusions at the ceramic formed body in a method of manufacturing a plasma reactor according to the invention (tenth invention).
Figure 59:
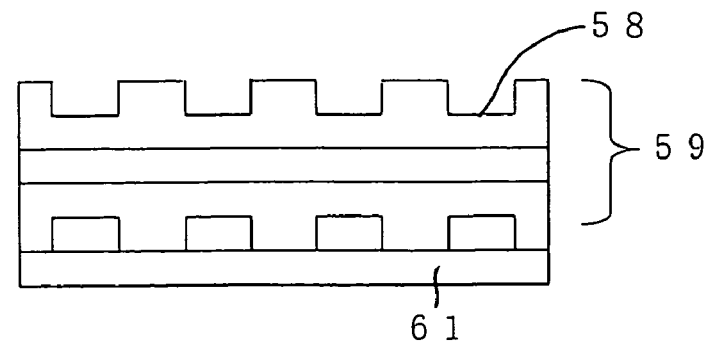
FIG. 59 is an explanatory diagram showing a step of forming a second conductor electrode in the method of manufacturing a plasma reactor according to the invention (tenth invention).
Figure 60:
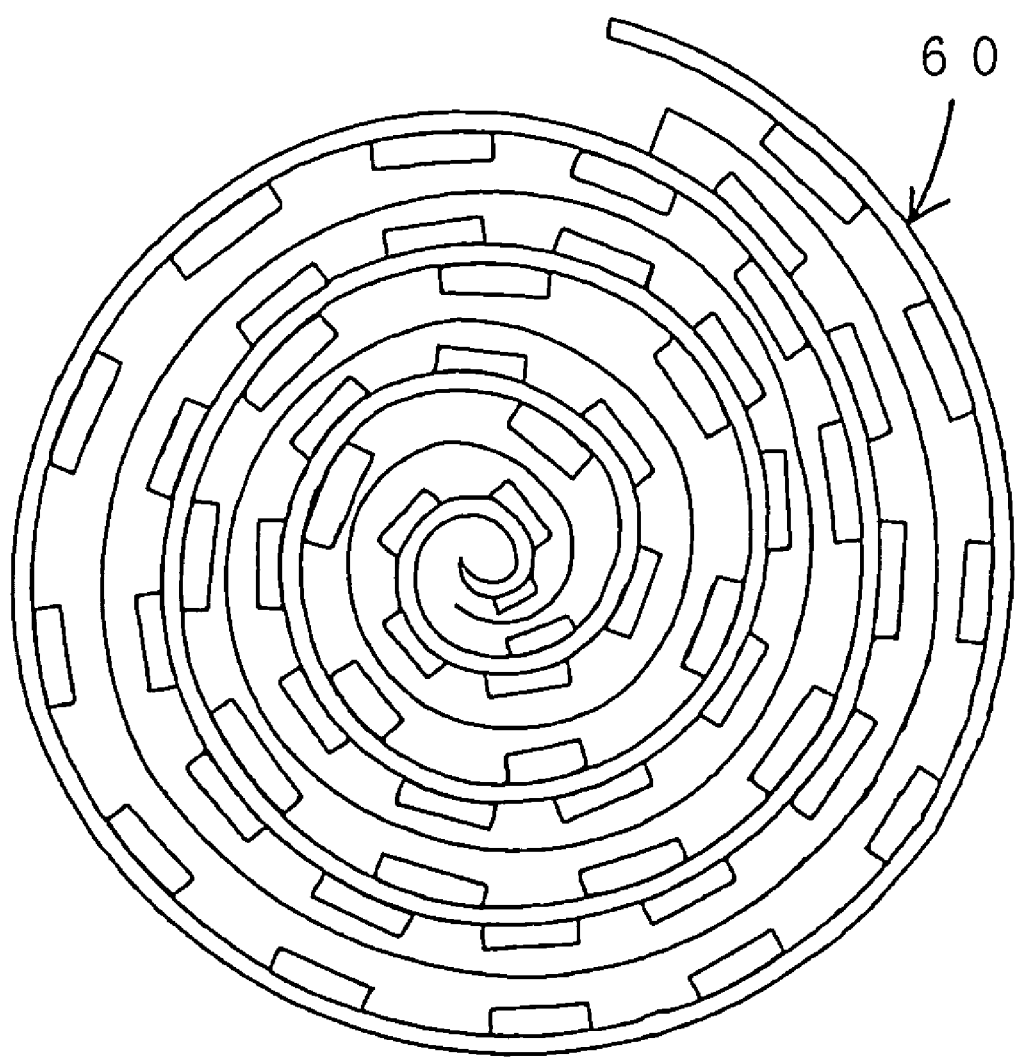
FIG. 60 is an explanatory diagram showing a step of forming a plasma generating electrode in the method of manufacturing a plasma reactor according to the invention (tenth invention).

One embodiment of a method of manufacturing a plasma reactor according to the invention (tenth invention) is described below. A method of manufacturing a plasma reactor according to the embodiment is a method of manufacturing a plasma reactor which includes a plasma generating electrode capable of generating plasma upon application of a voltage and can cause a gas to react by the plasma generated, the method comprising: forming the tape-shaped first and second unfired ceramic formed bodies 43 and 44 by tape-forming, as shown in FIG. 55; printing the first conductor electrode 45 on one surface of the resulting first unfired ceramic formed body 43 to form the unfired ceramic formed body 51a having an electrode, as shown in FIG. 56; layering the resulting unfired ceramic formed body 51a having an electrode and the second unfired ceramic formed body 44 so as to cover the conductor electrode 45 of the unfired ceramic formed body 51a having an electrode to form the unfired multilayer structure 52, as shown in FIG. 57; forming recesses and protrusions at each surface of the resulting unfired multilayer structure 52 (see FIG. 57) to form an unfired multilayer structure 58 having recesses and protrusions, as shown in FIG. 58; disposing the plate-shaped second conductor electrode 61 on one surface of the resulting unfired multilayer structure 58 having recesses and protrusions to form the unfired multilayer structure 59 having an electrode, as shown in FIG. 59; winding or folding one or more of the multilayer structures 59 having an electrode to form a wound unfired multilayer structure; and firing the resulting wound unfired multilayer structure to form the plasma generating electrode 60.

This configuration enables a plasma reactor which can generate uniform and stable plasma at low power consumption to be easily manufactured at low cost.

Figure 61:
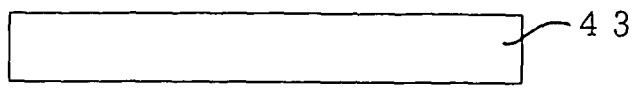
FIG. 61 is an explanatory diagram showing a step of forming a ceramic formed body in a method of manufacturing a plasma reactor according to the invention (eleventh invention).
Figure 61:
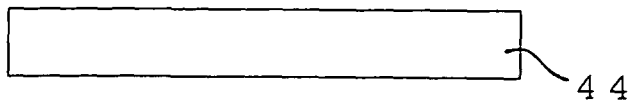
Figure 62:
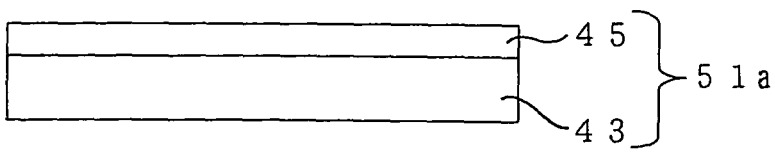
FIG. 62 is an explanatory diagram showing a step of forming a first conductor electrode in the method of manufacturing a plasma reactor according to the invention (eleventh invention).
Figure 63:
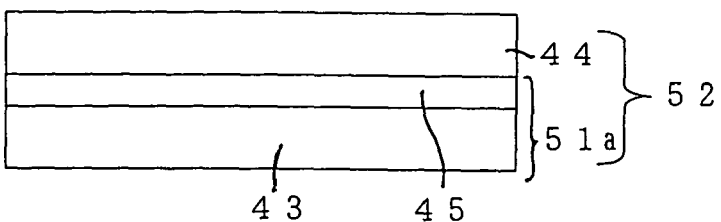
FIG. 63 is an explanatory diagram showing a step of layering a ceramic formed body in the method of manufacturing a plasma reactor according to the invention (eleventh invention).
Figure 64:
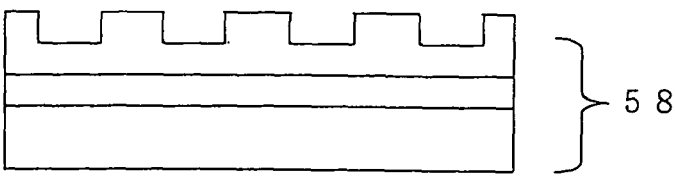
FIG. 64 is an explanatory diagram showing a step of forming recesses and protrusions at the ceramic formed body in a method of manufacturing a plasma reactor according to the invention (eleventh invention).
Figure 65:
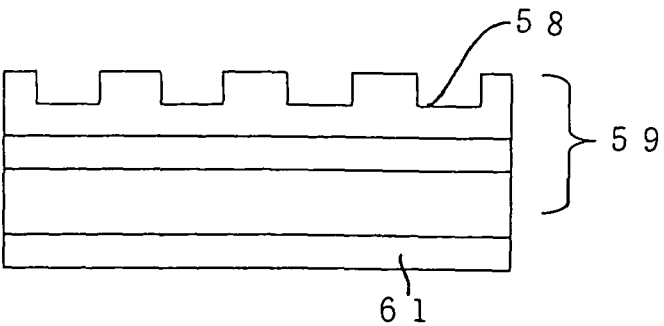
FIG. 65 is an explanatory diagram showing a step of forming a second conductor electrode in the method of manufacturing a plasma reactor according to the invention (eleventh invention).
Figure 66:
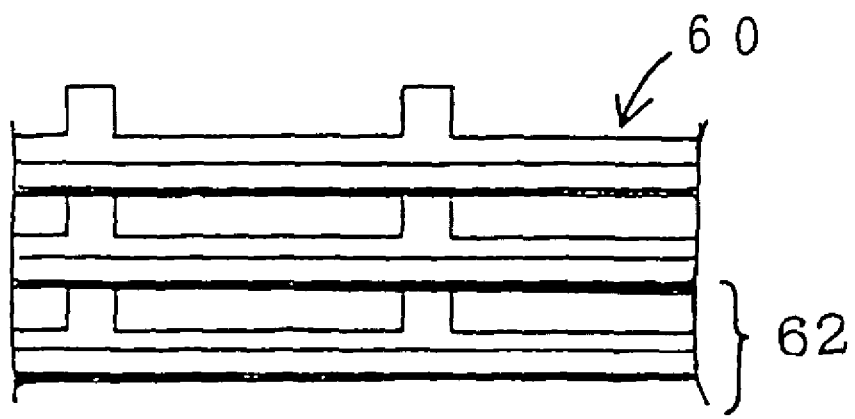
FIG. 66 is an explanatory diagram showing a step of forming a plasma generating electrode in the method of manufacturing a plasma reactor according to the invention (eleventh invention).

One embodiment of a method of manufacturing a plasma reactor according to the invention (eleventh invention) is described below. A method of manufacturing a plasma reactor according to the embodiment is a method of manufacturing a plasma reactor which includes a plasma generating electrode capable of generating plasma upon application of a voltage and can cause a gas to react by the plasma generated, the method comprising: forming the tape-shaped first and second unfired ceramic formed bodies 43 and 44 by tape-forming, as shown in FIG. 61; printing the first conductor electrode 45 on one surface of the resulting first unfired ceramic formed body 43 to form the unfired ceramic formed body 51a having an electrode, as shown in FIG. 62; layering the resulting unfired ceramic formed body 51a having an electrode and the second unfired ceramic formed body 44 so as to cover the conductor electrode 45 of the unfired ceramic formed body 51a having an electrode to form the unfired multilayer structure 52, as shown in FIG. 63; forming recesses and protrusions at one surface of the resulting unfired multilayer structure 52 (see FIG. 63) to form the unfired multilayer structure 58 having recesses and protrusions, as shown in FIG. 64; printing the second conductor electrode 61 on the other surface of the resulting unfired multilayer structure 58 having recesses and protrusions to form the multilayer structure 59 having an electrode, as shown in FIG. 65; firing the resulting unfired multilayer structure 59 having an electrode (see FIG. 65) to form the multilayer structure 62, as shown in FIG. 66; and layering two or more of the resulting multilayer structures 62 to form the plasma generating electrode 60.

This configuration enables a plasma reactor which can generate uniform and stable plasma at low power consumption to be easily manufactured at low cost.

Figure 67:
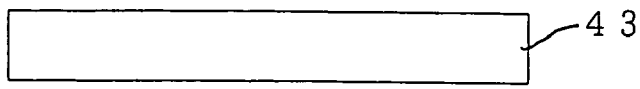
FIG. 67 is an explanatory diagram showing a step of forming a ceramic formed body in a method of manufacturing a plasma reactor according to the invention (twelfth invention).
Figure 67:
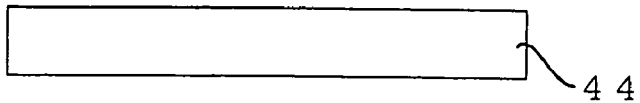
Figure 68:
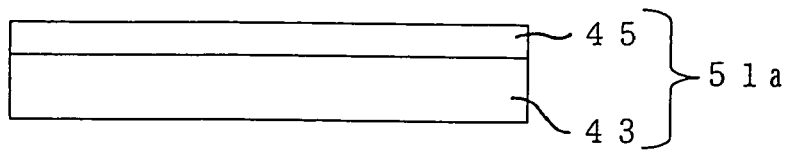
FIG. 68 is an explanatory diagram showing a step of forming a first conductor electrode in the method of manufacturing a plasma reactor according to the invention (twelfth invention).
Figure 69:
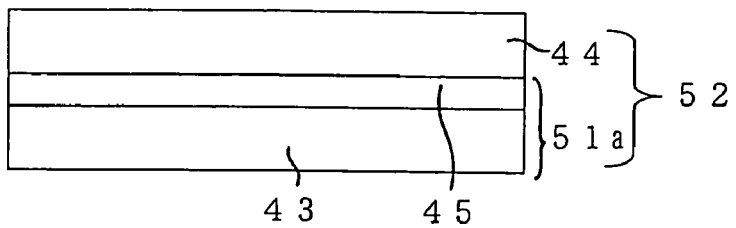
FIG. 69 is an explanatory diagram showing a step of layering a ceramic formed body in the method of manufacturing a plasma reactor according to the invention (twelfth invention).
Figure 70:
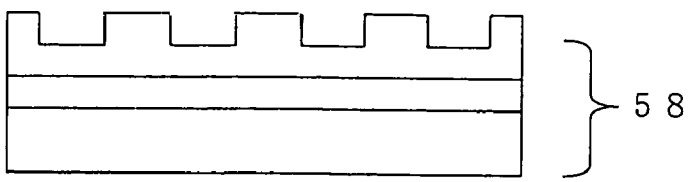
FIG. 70 is an explanatory diagram showing a step of forming recesses and protrusions at the ceramic formed body in a method of manufacturing a plasma reactor according to the invention (twelfth invention).
Figure 71:
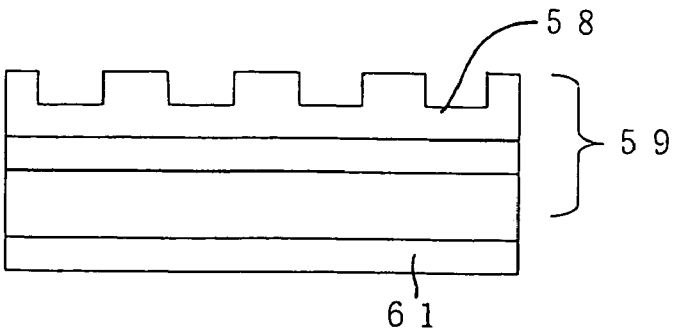
FIG. 71 is an explanatory diagram showing a step of forming a second conductor electrode in the method of manufacturing a plasma reactor according to the invention (twelfth invention).
Figure 72:
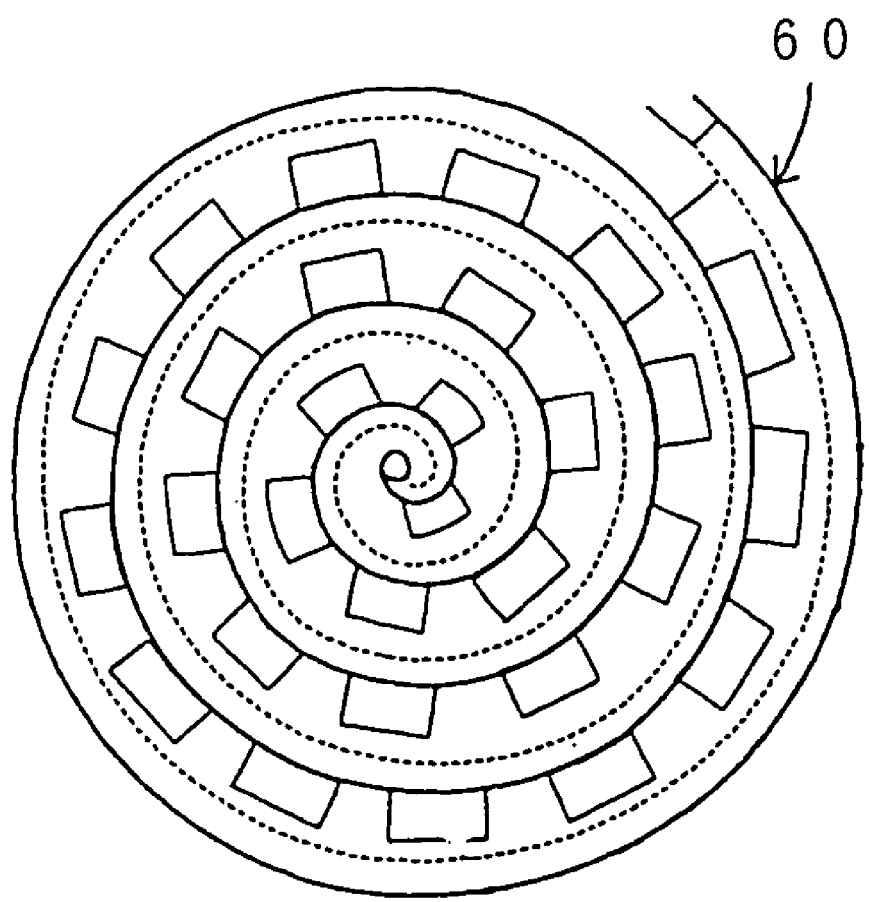
FIG. 72 is an explanatory diagram showing a step of forming a plasma generating electrode in the method of manufacturing a plasma reactor according to the invention (twelfth invention).

One embodiment of a method of manufacturing a plasma reactor according to the invention (twelfth invention) is described below. A method of manufacturing a plasma reactor according to the embodiment is a method of manufacturing a plasma reactor which includes a plasma generating electrode capable of generating plasma upon application of a voltage and can cause a gas to react by the plasma generated, the method comprising: forming the tape-shaped first and second unfired ceramic formed bodies 43 and 44 by tape-forming, as shown in FIG. 67; printing the first conductor electrode 45 on one surface of the resulting first unfired ceramic formed body 43 to form the unfired ceramic formed body 51a having an electrode, as shown in FIG. 68; layering the resulting unfired ceramic formed body 51a having an electrode and the second unfired ceramic formed body 44 so as to cover the conductor electrode 45 of the unfired ceramic formed body 51a having an electrode to form the unfired multilayer structure 52, as shown in FIG. 69; forming recesses and protrusions at one surface of the resulting unfired multilayer structure 52 (see FIG. 69) to form the unfired multilayer structure 58 having recesses and protrusions, as shown in FIG. 70; disposing the plate-shaped second conductor electrode 61 on the other surface of the resulting unfired multilayer structure 58 having recesses and protrusions to form the unfired multilayer structure 59 having an electrode, as shown in FIG. 71; winding or folding one or more of the multilayer structures 59 having an electrode to form a wound unfired multilayer structure, as shown in FIG. 72; and firing the resulting wound unfired multilayer structure to form the plasma generating electrode 60.

This configuration enables a plasma reactor which can generate uniform and stable plasma at low power consumption to be easily manufactured at low cost.

The above-described method of manufacturing a plasma reactor according to the invention (third to twelfth inventions) preferably further includes placing the plasma generating electrode in a conductive casing with a buffer material having conductivity and elasticity interposed therebetween.

The above-described method of manufacturing a plasma reactor according to the invention (third to twelfth inventions) is not limited to the above-described manufacturing method. For example, the order of the step of forming the recesses and protrusions on the surfaces of the first and second unfired ceramic formed bodies may be changed insofar as the step is carried out before the step of layering and winding the multilayer structure or before the step of folding the multilayer structure. In the step of forming the plasma generating electrode in a layered shape, the multilayer structures are layered after firing the unfired multilayer structures. However, the multilayer structures may be fired after layering the unfired multilayer structures.

The invention is described below in detail by way of examples. However, the invention should not be construed as being limited to the following examples.

EXAMPLES 1 TO 6

Toluene as an organic solvent, a cellulose resin as a binder, and dioctyl phthalate (DOP) as a plasticizer were mixed with alumina powder. The mixture was sufficiently diffused and mixed using a trommel, and subjected to viscosity adjustment by a stirring bubble removal method under reduced pressure to prepare a slurry. A ceramic formed body having a thickness of 0.5 to 1 mm was tape-formed using the slurry by a doctor blade method. A tungsten cermet powder paste was printed on one side of the tape-shaped ceramic formed body, and then dried to form a conductor electrode. Another ceramic formed body was layered on the side on which the conductor electrode was formed to obtain a multilayer structure having a ceramic formed body/conductor electrode/ceramic formed body sandwich structure. The resulting multilayer structure was placed on a flat stand, and a gear wheel on which recesses and protrusions were formed at the surface was pressed against and rotated on the surface of the multilayer structure to obtain six types of multilayer structures having a recess/protrusion pitch of 4 mm, a protrusion width of 1 mm, a protrusion height h of 0.3 to 1.5 mm, and a thin section thickness after processing of 0.7 to 1.5 mm. Two of the multilayer structures on which the recesses and protrusions having the same shape were formed were layered in a state in which the multilayer structures had plasticity, and wound in a spiral shape. The multilayer structures were debinded and fired to a fired body to form a plasma generating electrode. The resulting plasma generating electrode was placed in a metal casing and provided with electrode wiring to obtain a plasma reactor (plasma device) having a diameter of 93 mm and a length of 50 mm (Examples 1 to 6).

A pulse voltage having a peak voltage of 5 kV and a peak pulse rate of 1 kHz was applied to the conductor electrode functioning as the pulse electrode of the plasma reactor (Examples 1 to 6) to observe the plasma generation state, and the conversion rate from NO to $NO_2$ was measured by causing 100 l/min of room-temperature air at an NO concentration of 400 ppm to pass through the plasma reactor to measure the NO concentration before and after causing the gas to pass through the plasma reactor. The passage resistance when causing the gas to pass through the plasma reactor was also measured. The measurement results are shown in Table 1.

TABLE 1

|  | Example 1 | Example 2 | Example 3 | Example 4 | Example 5 | Example 6 |
|---|---|---|---|---|---|---|
| Height h of protrusion (mm) | 0.3 | 0.5 | 0.5 | 1 | 1 | 1.5 |
| Thickness t of thin section of plasma generating electrode(mm) | 0.7 | 0.7 | 1.5 | 0.7 | 1.5 | 1.5 |
| 0.7 t | 0.49 | 0.49 | 1.05 | 0.49 | 1.05 | 1.05 |
| Passage resistance | Low | Medium | Low | High | Medium | High |

The plasma reactors of Examples 1 to 6 showed an NO decreasing rate of 90% or more. In particular, the plasma reactors of Examples 1 and 3 showed a low passage resistance so that the engine performance will not be decreased even when the plasma reactors are installed in an automotive engine or the like.

EXAMPLES 7 TO 10

A plasma reactor provided with a spiral plasma generating electrode manufactured using cordierite (Examples 7 and 8) and a plasma reactor provided with a spiral plasma generating electrode manufactured using alumina (Examples 9 and 10) were obtained in the same manner as in the method of manufacturing the plasma reactors of Examples 1 to 6. The thermal shock resistance of the plasma generating electrode (cordierite plasma generating electrode and alumina plasma generating electrode) used in the plasma reactor was measured. The thermal shock resistance was measured by heating the plasma generating electrode for 30 minutes in an electric furnace, removing the plasma generating electrode from the electric furnace after heating, allows the plasma generating electrode to cool, and investigating the presence or absence of cracks on the surface of the plasma generating electrode due to cooling, by microscope observation. The results are shown in Table 2.

TABLE 2

| Heating temperature (° C.) | Example 7 | Example 8 | Example 9 | Example 10 |
|---|---|---|---|---|
| 650 | Cracks did not occur | Cracks did not occur | Cracks did not occur | Cracks did not occur |
| 700 | Cracks did not occur | Cracks did not occur | Cracks did not occur | Cracks occurred |

TABLE 2-continued

| Heating temperature (° C.) | Example 7 | Example 8 | Example 9 | Example 10 |
|---|---|---|---|---|
| 750 | Cracks did not occur | Cracks did not occur | Cracks did not occur | Cracks occurred |
| 800 | Cracks did not occur | Cracks did not occur | Cracks occurred | Cracks occurred |
| 850 | Cracks did not occur | Cracks did not occur | Cracks occurred | Cracks occurred |
| 900 | Cracks did not occur | Cracks did not occur | Cracks occurred | Cracks occurred |
| 950 | Cracks did not occur | Cracks did not occur | Cracks occurred | Cracks occurred |
| 1000 | Cracks did not occur | Cracks did not occur | Cracks occurred | Cracks occurred |
| 1050 | Cracks did not occur | Cracks did not occur | Cracks occurred | Cracks occurred |
| 1100 | Cracks did not occur | Cracks did not occur | Cracks occurred | Cracks occurred |
| 1150 | Cracks did not occur | Cracks did not occur | Cracks occurred | Cracks occurred |
| 1200 | Cracks did not occur | Cracks did not occur | Cracks occurred | Cracks occurred |

The plasma generating electrodes used in the plasma reactors of Examples 7 and 8 did not produce cracks up to 1200° C., exhibiting an excellent thermal shock resistance. The plasma generating electrode used in the plasma reactor of Example 9 did not produce cracks up to 750° C, and the plasma generating electrode used in the plasma reactor of Example 10 did not produce cracks up to 650° C. Therefore, these plasma generating electrodes exhibited an excellent thermal shock resistance in comparison with the conventional plasma generating electrode, although the thermal shock resistance was decreased in comparison with the cordierite plasma generating electrode.

INDUSTRIAL APPLICABILITY

As described above, since the plasma reactor according to the invention can generate uniform and stable plasma at low power consumption and can reduce the passage resistance of a gas which passes through the plasma reactor, the plasma reactor of the invention may be suitably used in a processing device which processes engine exhaust gas or various incinerator exhaust gases or the like. The method of manufacturing a plasma reactor according to the invention enables easy and inexpensive manufacture of such a plasma reactor.

The invention claimed is:

1. A method of manufacturing a plasma reactor which includes a plasma generating electrode capable of generating plasma upon application of a voltage and can cause a gas to react by the plasma generated, the method comprising:
    forming tape-shaped first and second unfired ceramic formed bodies by tape-forming;
    printing a conductor electrode on one surface of the resulting first unfired ceramic formed body to form an unfired ceramic formed body having the conductor electrode;
    layering the resulting unfired ceramic formed body having the conductor electrode and the second unfired ceramic formed body so as to cover the conductor electrode of the unfired ceramic formed body having the conductor electrode to form an unfired multilayer structure; and
    then folding two or more of the resulting unfired multilayer structures to form a folded unfired multilayer structure and firing the folded unfired multilayer structure to form the plasma generating electrode.

2. The method of manufacturing a plasma reactor according to claim 1, wherein
    the method further includes forming recesses and protrusions at other surface thereof to form an unfired ceramic formed body having the conductor electrode after printing the conductor electrode on one surface of the resulting first unfired ceramic formed body.

3. The method of manufacturing a plasma reactor according to claim 1, wherein
    the method includes forming recesses and protrusions at one surface of the resulting unfired multilayer structure to form an unfired multilayer structure having recesses and protrusions after layering the resulting unfired ceramic formed body having the conductor electrode and the second unfired ceramic formed body to form an unfired multilayer structure.

4. The method of manufacturing a plasma reactor according to claim 2, comprising
    forming recesses and protrusions at a surface of the first unfired ceramic formed body or the unfired multilayer structure by rotating a gear wheel in a shape of recesses and protrusions while pressing the gear wheel.

5. The method of manufacturing a plasma reactor according to claim 2, comprising
    placing the plasma generating electrode in a conductive casing with a buffer material having conductive and elasticity interposed therebetween.

6. The method of manufacturing a plasma reactor according to claim 2, wherein
    at least one material selected from the group consisting of cordierite, mullite, alumina, silicon nitride, SIALON, and zirconia is used as a material for the first and second unfired ceramic formed bodies.

7. The method of manufacturing a plasma reactor according to claim 2, wherein the first and second unfired ceramic formed bodies are fired so that porosity after firing is 0.5 to 35%.

8. The method of manufacturing plasma reactor according to claim 1, wherein the number of resulting unfired multilayer structures in the two or more of the resulting unfired multilayer structure is an even number.

9. A method of manufacturing a plasma reactor which includes a plasma generating electrode capable of generating plasma upon application of a voltage and can cause a gas to react by the plasma generated, the method comprising:
    forming tape-shaped first and second unfired ceramic formed bodies by tape-forming;
    printing a first conductor electrode on one surface of the resulting first unfired ceramic formed body to form an unfired ceramic formed body having the first conductor electrode;
    layering the resulting unfired ceramic formed body having the first conductor electrode and the second unfired ceramic formed body so as to cover the first conductor electrode of the unfired ceramic formed body having the first conductor electrode to form an unfired multilayer structure;
    forming recesses and protrusions at each surface of the resulting unfired multilayer structure to form an unfired multilayer structure having recesses and protrusions;
    disposing a plate-shaped second conductor electrode on one surface of the resulting unfired multilayer structure having recesses and protrusions to form an unfired multilayer structure having the first conductor electrode and the plate-shaped second conductor electrode; and then folding at least one of the resulting unfired multilayer structures having the first conductor electrodes and the second conductor electrodes to form a folded unfired multilayer structure; and firing the folded unfired multilayer structure to form the plasma generating electrode.

10. A method of manufacturing a plasma reactor which includes a plasma generating electrode capable of generating plasma upon application of a voltage and can cause a gas to react by the plasma generated, the method comprising:

forming tape-shaped first and second unfired ceramic formed bodies by tape-forming;

printing a first conductor electrode on one surface of the resulting first unfired ceramic formed body to form an unfired ceramic formed body having the first conductor electrode;

layering the resulting unfired ceramic formed body having the first conductor electrode and the second unfired ceramic formed body so as to cover the first conductor electrode of the unfired ceramic formed body having the first conductor electrode to form an unfired multilayer structure;

forming recesses and protrusions at one surface of the resulting unfired multilayer structure to form an unfired multilayer structure having recesses and protrusions;

printing a second conductor electrode on the other surface of the resulting unfired multilayer structure having recesses and protrusions, the second conductor electrode only contacting the protrusions of the one surface, to form an unfired multilayer structure having the first conductor electrode and the second conductor electrode; and folding two or more of the resulting unfired multilayer structures having the first conductor electrodes and the second conductor electrodes to form a folded unfired multilayer structure; and firing the folded unfired multilayer structure to form the plasma generating electrode.

11. The method of manufacturing plasma reactor according to claim 10, wherein the number of resulting unfired multilayer structures in the two or more of the resulting unfired multilayer structure is an even number.

* * * * *